United States Patent
Henderson

(10) Patent No.: US 12,416,609 B1
(45) Date of Patent: Sep. 16, 2025

(54) METHODS AND SYSTEMS FOR CARRIER GAS IDENTIFICATION IN GAS CHROMATOGRAPHY

(71) Applicant: Agilent Technologies, Inc., Santa Clara, CA (US)

(72) Inventor: Robert C. Henderson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 352 days.

(21) Appl. No.: 18/018,492

(22) PCT Filed: Jul. 6, 2021

(86) PCT No.: PCT/US2021/040515
§ 371 (c)(1),
(2) Date: Jan. 27, 2023

(87) PCT Pub. No.: WO2022/026131
PCT Pub. Date: Feb. 3, 2022

Related U.S. Application Data

(60) Provisional application No. 63/056,832, filed on Jul. 27, 2020.

(51) Int. Cl.
*G01N 30/86* (2006.01)
*B01D 53/02* (2006.01)
(Continued)

(52) U.S. Cl.
CPC ....... *G01N 30/8665* (2013.01); *B01D 53/025* (2013.01); *G01N 30/30* (2013.01);
(Continued)

(58) Field of Classification Search
CPC ............... G01N 30/34; G01N 30/8665; G01N 30/8658; G01N 2030/025
See application file for complete search history.

(56) References Cited

U.S. PATENT DOCUMENTS 3,622,276 A * 11/1971 Haahti .................. G01N 30/50
436/139
5,431,712 A * 7/1995 Henderson ............. G01N 30/24
95/82
(Continued)

FOREIGN PATENT DOCUMENTS

EP 0552529 A1 7/1993
JP 4325374 B2 * 9/2009 ............. G01N 30/20
WO 2013070954 A1 5/2013

OTHER PUBLICATIONS

EPO, et al., "Extended European Search Report Received mailed on Jul. 31, 2024," Application No. 21851331.5, 6 pages.
(Continued)

*Primary Examiner* — John Fitzgerald

(57) ABSTRACT

Methods and systems for carrier gas identification in gas chromatography are described herein. In one aspect, a gas chromatography system can include a pneumatic system including an input flowpath in fluidic communication with a first output flowpath and a second output flowpath; a first flow sensor configured to generate a flow measurement signal corresponding to a first property of a gas; a second flow sensor configured to generate a second flow measurement signal corresponding to a second property of the gas different than the first gas property; and a controller programmed to: determine the first flow measurement signal for the flow of gas through the pneumatic system; determine the second flow measurement signal for the flow of gas through the pneumatic system; and identify a type of gas for the flow of gas through the pneumatic system from the first and second flow measurement signals.

20 Claims, 12 Drawing Sheets

(51) Int. Cl.
*G01N 30/30* (2006.01)
*G01N 30/32* (2006.01)
*G01N 30/02* (2006.01)

(52) U.S. Cl.
CPC ....... *G01N 30/32* (2013.01); *G01N 2030/025* (2013.01); *G01N 2030/328* (2013.01)

(56) References Cited

U.S. PATENT DOCUMENTS

| | | | | |
|---|---|---|---|---|
| 5,542,286 | A | * | 8/1996 | Wang ..................... G01N 30/32 73/23.24 |
| 5,545,252 | A | * | 8/1996 | Hinshaw ................. G01N 30/32 95/82 |
| 5,567,227 | A | | 10/1996 | Henderson |
| 7,219,532 | B2 | * | 5/2007 | Tipler .................... G01N 30/32 73/23.42 |
| 12,247,860 | B2 | * | 3/2025 | Nelson ..................... G01F 1/68 |
| 2005/0109079 | A1 | * | 5/2005 | Furukawa .............. G01N 30/20 73/23.42 |
| 2007/0261474 | A1 | | 11/2007 | Tipler et al. |
| 2012/0186331 | A1 | | 7/2012 | Tipler |
| 2016/0161951 | A1 | * | 6/2016 | Hornung .................. G05D 7/00 73/25.03 |
| 2024/0201208 | A1 | * | 6/2024 | Keller .................... G01N 13/02 |
| 2024/0418687 | A1 | * | 12/2024 | Verschueren .......... G01N 30/12 |

OTHER PUBLICATIONS

International Searching Authority, "International Search Report and Written Opinion," issued in connection with PCT Application No. PCT/US2021/040515, issued on Oct. 27, 2021, 6 pages.

* cited by examiner

METHODS AND SYSTEMS FOR CARRIER GAS IDENTIFICATION IN GAS CHROMATOGRAPHY

CROSS-REFERENCE TO RELATED APPLICATION

This application is a U.S. national stage entry of International Application No. PCT/US21/40515, filed on Jul. 6, 2021, which claims priority to and benefit of U.S. Provisional Patent Application No. 63/056,832, filed on Jul. 27, 2020, the contents of which are incorporated herein by reference in their entirety.

BACKGROUND OF THE INVENTION

In gas chromatography, the composition of a sample is determined by the sample passing through a gas chromatography column. A time variation can occur between different molecular components of the sample as a carrier gas transports the sample components from one end of the column to the other. The gas chromatography system can rely on this time variation to identify the different components included in the sample.

However, the time it takes different sample components to traverse the column can be dependent on the composition of the carrier gas used to transport the sample through the column. Incorrect carrier gas identification can lead to performance issues. For example, if the carrier gas is incorrectly identified, the flow rate of the carrier gas may not be controlled correctly. This can lead to a misidentification of the different components of the samples reaching the detector at the end of the column, poor peak shape, and poor separation of the sample components among other issues.

SUMMARY

Methods and systems for carrier gas identification in gas chromatography are described herein. In one aspect, a gas chromatography system can include a pneumatic system including at least one input flowpath in fluidic communication with at least a first output flowpath and a second output flowpath; a first flow sensor located on the input flowpath, the first flow sensor configured to generate a flow measurement signal corresponding to a first property of a gas; a second flow sensor located on the first output flowpath, the second flow sensor configured to generate a second flow measurement signal corresponding to a second property of the gas different than the first gas property; and a controller programmed to: flow gas through the pneumatic system; determine the first flow measurement signal for the flow of gas through the pneumatic system from the first flow sensor; determine the second flow measurement signal for the flow of gas through the pneumatic system from the second flow sensor; and identify a type of gas for the flow of gas through the pneumatic system from the first and second flow measurement signals.

This aspect can include a variety of embodiments. In one embodiment, the microcontroller can be further configured to execute a calibration procedure, where the calibration procedure includes: flowing a known type of gas through the pneumatic system; controlling a flow rate of the known type of gas via an external flow controller; and correlating an output of the first and/or second flow sensor, or both, to the controlled flow rate. In some cases, the gas chromatography system can further include at least one valve located along the input flowpath, the first output flowpath, and/or the second output flowpath, where the microcontroller can be further configured to cause the at least one valve to modify the flow through the pneumatic system.

In another embodiment, the properties of the gas can include viscosity and one or more of thermal dispersion, thermal conductivity, and heat capacity.

In another embodiment, the microcontroller can be further configured to: compare the identified type of gas to a user-inputted type of gas; and generate an alert if the identified type of gas does not match with the user-inputted type of gas.

In another embodiment, the microcontroller can be further configured to adjust one or more settings of the gas chromatography system based on the identified type of gas.

In another embodiment, the gas chromatography system can include a third flow sensor located on the second output flowpath, where the microcontroller can be further configured to: generate a third flow measurement signal from the third-flow sensor; and identify the type of gas for the flow of gas through the pneumatic system from the first, second, and third flow measurement signals.

In another embodiment, the flow measurement signals are flow rates for an assumed configured gas. In some cases, the gas chromatography system can further include a third flow sensor located on the second output flowpath, where the microcontroller can be further configured to: generate a third flow rate from the third-flow sensor for the assumed configured gas type; sum the second flow rate and the third flow rate; and compare the summed flow rates to the first flow rate and determine if the assumed configured gas type corresponds to the type of gas flowing through the pneumatic system according to the comparison.

In some cases, the microcontroller can be further configured to: determine that the assumed configured gas type corresponds to the type of gas flowing through the pneumatic system based on a difference between the summed flow rates and the first flow rate being below a threshold.

In some cases, the microcontroller can be further configured to: identify the type of gas for the flow of gas through the pneumatic system based on the difference between the summed flow rates and the first flow rate by comparing the difference to an expected difference for one or more expected gas type.

In another embodiment, the gas chromatography system can further include: an electric heater in fluidic communication with the gas, where the controller can be further configured to: cause the electric heater to heat a portion of the gas to a predetermined temperature; determine a heater energy required to heat the portion of the gas to the predetermined temperature; and identify the type of gas for the flow of gas through the pneumatic system from the first and second flow measurement signals and the heater power required to heat the portion of the gas to the predetermined temperature.

In another embodiment, the gas chromatography system can further include: an electric heater in fluidic communication with the gas, where the controller is further configured to: control the heater to heat the gas to a predetermined temperature; measure a heater energy required to heat the gas to the predetermined temperature; partition the possible gas types into at least two groups based on a physical property; and determine from the required heater power which of these at least two groups the gas flowing through the pneumatic system belongs to.

In another aspect, a gas chromatography system can include: a pneumatic system including at least one input flowpath in fluidic communication with at least a first output flowpath and a second output flowpath; a first flow sensor located on the input flowpath, the first flow sensor configured to utilize a first property of a gas to generate a flow measurement signal; a second flow sensor located on the first output flowpath, the second flow sensor configured to utilize a second property of the gas different than the first gas property to generate a flow measurement signal; and a microcontroller programmed to: flow gas through the pneumatic system to generate a first flow measurement signal from the first flow sensor and a second flow measurement signal from the second flow sensor; change the flow rate of gas through the input flowpath and first output flowpath while keeping the flow rate of the gas through the second output flowpath substantially constant and generate a third flow measurement signal from the first flow sensor and a fourth flow measurement signal from the second flow sensor; calculate a first change in flow measurement signal by taking the difference between the first and third flow measurement signals; calculate a second change in flow measurement signal by taking the difference between the second and fourth flow measurement signals; and identify a type of gas by comparing the first change in flow measurement signal to the second change in flow measurement signal.

This aspect can include a variety of embodiments. In one embodiment, the microcontroller can be further configured to execute a calibration procedure, where the calibration procedure includes: flow a known type of gas through the pneumatic system; control a flow rate of the known type of gas via an external flow controller; and correlate an output of the first and/or second flow sensor to the controlled flow rate.

In another embodiment, the gas chromatography system can include at least one valve located along the input flowpath, the first output flowpath, the second output flowpath, or any combination, where the microcontroller can be further configured to utilize the valve(s) to modify the flow through the pneumatic system.

In another embodiment, the microcontroller can be further configured to: compare the identified type of gas to a user-inputted type of gas; and generate an alert if the identified type of gas does not match with the user-inputted type of gas.

In another embodiment, the gas chromatography system can further include an electric heater in fluidic communication with the gas, where the microcontroller is further configured to: control the heater to heat the gas to a temperature; measure the heater power required to heat the gas to a temperature; and identify a type of gas using the required heater power.

In another embodiment, the gas chromatography system can further include an electric heater in fluidic communication with the gas, where the microcontroller is further configured to: control the heater to heat the gas to a temperature; measure the heater power required to heat the gas to a temperature; partition the possible gas types into at least two groups based on a physical property; and use the required heater power to determine which of these at least two groups the gas flowing through the pneumatic system belongs to.

In another embodiment, the flow measurement signals are flow rates for a configured gas and the microcontroller is further configured to: identify that the configured gas type is the gas type flowing through the pneumatic system due to the difference between the first change in flow measurement signal and the second change in flow measurement signal being substantially the same within a threshold.

In another embodiment, the flow measurement signals are flow rates for a configured gas and the microcontroller is further configured to: use the difference between the first change in flow measurement signal and the second change in flow measurement signal to identify the gas type by comparing the difference to the difference expected for each possible gas type.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

"Configured gas" can refer to the gas to which the gas chromatography system or the pneumatic system is configured to flow. For example, the system can rely on different parameters or characteristic of the configured gas to calibrate components of the system (e.g., valves, flow amount, flow rate, etc.) in anticipation of gas flow. The configured gas can be specified, e.g., by a user interface such as a graphical user interface, a switch, by a system estimation of the gas, and the like.

"Actual gas" can refer to the gas that flows through the gas chromatography system or pneumatic system. In some cases, the actual gas flowing through the system can be different than the configured gas, in particular when the configured gas is selected erroneously by a user or the system.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range is understood to include any number, combination of numbers, and the like (as well as fractions thereof unless the context clearly dictates otherwise).

DETAILED DESCRIPTION OF THE INVENTION

Gas Chromatography System

Figure 1:
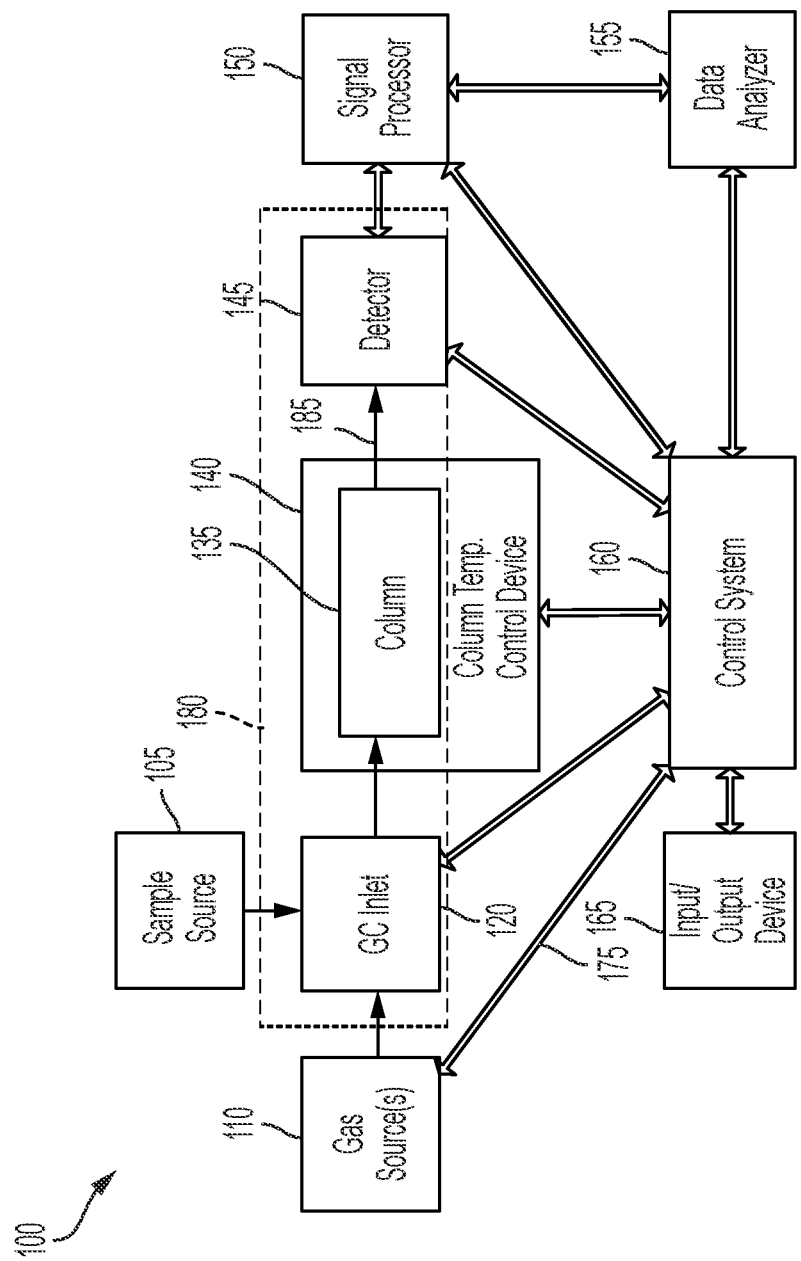
FIG. 1 depicts a gas chromatography system according to an embodiment of the claimed invention.

The methods described herein can be implemented by, and the systems described herein can be a part of, a gas chromatography system. An exemplary gas chromatography system is illustrated in FIG. 1. The gas chromatography system can vaporize, separate, and detect components of a sample. This can be achieved by injecting a sample into a gas chromatography ("GC") system, flowing a sample through a GC column where the components or analytes of a sample are separated, and producing a signal representative of the relative quantity and/or identity of an analyte as the analytes pass through a detector. As shown in FIG. 1, fluid flow through the system are depicted as single-lined arrows, such as arrow 185, and electronic communications within the system are depicted as double-lined arrows, such as arrow 175.

Sample Source

Sample source 105 can contain any sample with the ability to be transitioned to a gaseous phase by the gas chromatography system, e.g., any solid, liquid, or gaseous material having a phase transition at temperatures of up to approximately 450° C. Thus, a significant number of chemicals and biologicals are available as the sample source 105. In some cases, the sample source 105 can be stored prior to a source extraction, such as in a vial or container.

GC Inlet

Figure 2:
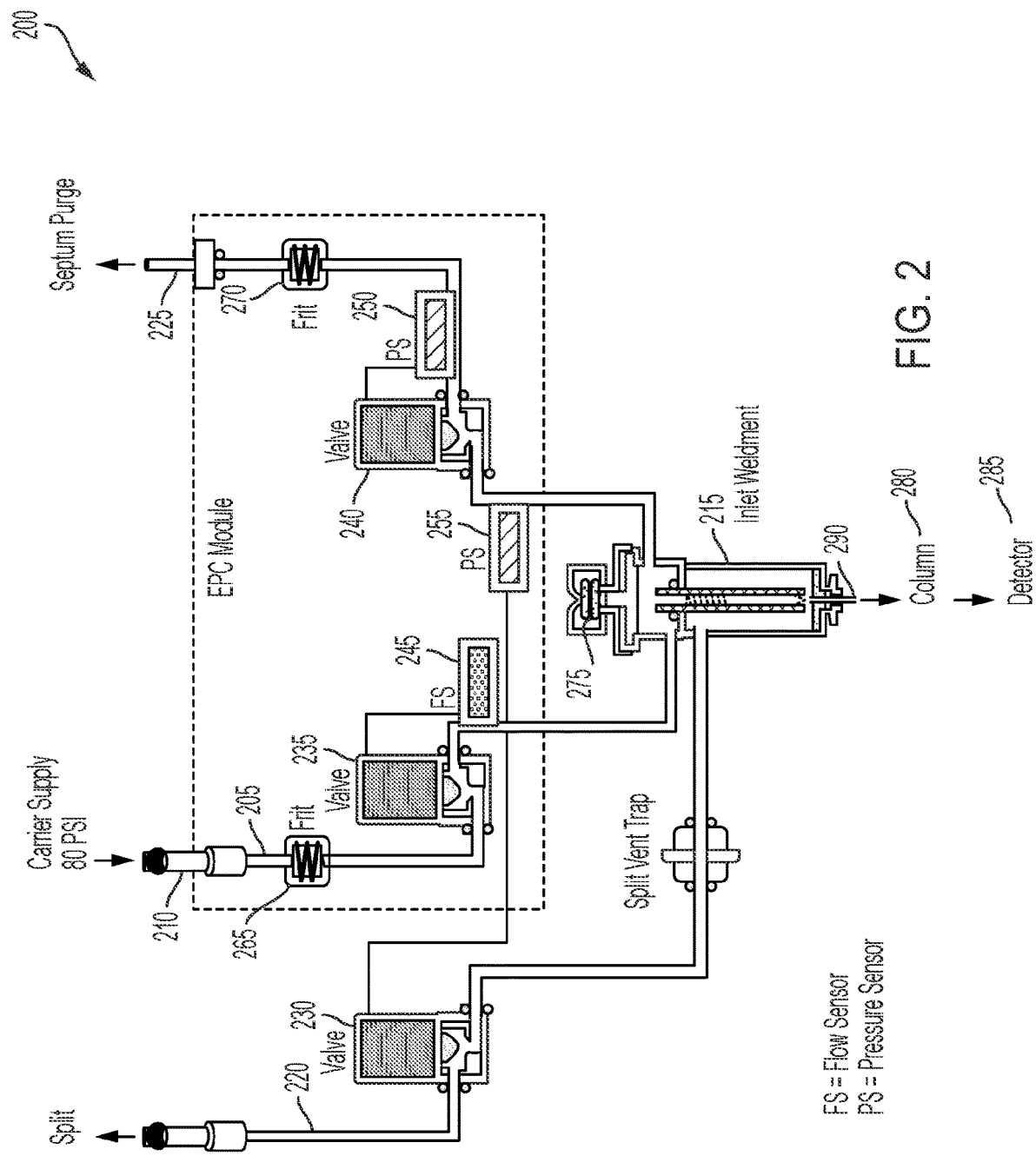
FIG. 2 illustrates a pneumatic system according to an embodiment of the claimed invention.

The gas chromatography system 100 can also include a GC inlet 120, for example, the GC inlet depicted in FIG. 2. The GC inlet 120 can further regulate sample and carrier gas transportation to the column 135 and other flow components of the gas chromatography system 100. The GC inlet can also be a part of a pneumatic system, such as pneumatic system 180.

An embodiment of a pneumatic system is illustrated in FIG. 2. The pneumatic system 200 can be an example of pneumatic system 180 of FIG. 1. The sample to be analyzed can be injected into the GC inlet of the pneumatic system. This typically occurs by measuring out a quantity of sample using an autosampler (e.g., a liquid autosampler, an headspace sampler, a purge and trap, valves, etc.) or manually using a needle, syringe, or other sample probe or tubing that punctures the septum 275 of the pneumatic system and enables sample to flow into the interior volume of the inlet weldment 215. Alternatively, a sampling device (e.g., valves) may be connected to the GC inlet by other means (e.g., tubing, weldments, etc.) to allow the sample to flow into the inlet without the use of a septum. If not already in a gaseous state, the sample injected into the GC inlet may be vaporized within the GC inlet before flowing into the GC column fluidically coupled to the GC inlet. The inlet may be heated to temperatures up to approximately 450° C. to facilitate the vaporization of the sample or maintain the sample in a gaseous state.

The pneumatic system 200 can include a plurality of flowpaths fluidically coupled to the GC inlet weldment 215. Some flowpaths are input flowpaths, where gas flows from an external source into the GC inlet, and some flowpaths are output flowpaths where gas flows out of the pneumatic system to an external sink, such as the ambient environment or other components of the GC system (e.g., the GC column, detector, etc.)

The pneumatic system 200 can include a carrier gas supply flowpath 205. The carrier gas supply flowpath 205 is an input flowpath and can connect a carrier supply port 210 to a GC inlet weldment 215. For example, the pneumatic system 200 can receive the carrier gas via the carrier supply port 210 and from gas source 110 such as a pressurized container of gas or a laboratory gas supply manifold. The carrier gas can be an inert gas that is used to flow the sample through the various components of the GC system, such as the GC inlet, GC column(s), and detector(s). Examples of carrier gases include Helium, Nitrogen, Hydrogen, a mixture of Argon-Methane, and the like.

The pneumatic system can also include a septum purge flowpath 225. The septum purge flowpath 225 is an output flowpath and can facilitate the regulation of pressure, sample volume, and the like, within the pneumatic system 200. Carrier gas entering the GC inlet through the carrier gas supply flowpath may flow through the septum purge flowpath after passing by the GC inlet septum. This allows gases generated from the inlet septum to be purged from the system to avoid contaminating the sample flowpath, such as the GC column and/or detector. The septum purge flowpath 225 can be connected to a purge vent. The purge vent, when open, can release contents, pressure, and the like, from the septum purge flowpath to the ambient environment.

In some cases, the pneumatic system can also include a split flowpath 220, which is an output flowpath. The split flowpath, when open, can also release contents, pressure, and the like, from the split flowpath 220 to the ambient environment. Further, the split flowpath 220 can regulate the volume and/or percentage of sample inputted into the inlet that is transported to the column (e.g., column 280) by allowing some of the carrier gas mixed with the sample to exit the GC inlet through the split flowpath 220 to waste rather than through the GC column. This allows a reduced amount of sample to enter the column to avoid overloading the column, which can result in poor peak shape. The split flowpath 220 can be connected to a split vent, which can lead to an ambient environment.

The pneumatic system 200 can also include a column flowpath, which can include the GC column 280. The column flowpath can flow carrier gas and sample from the interior of the pneumatic system of the GC inlet weldment to the column (e.g., column 280) to be analyzed. In most instances, the column flowpath is an output flowpath, for example, when flowing sample through the GC column or in standby mode when flowing carrier gas through the GC column. However, in some instances, the column flowpath may be an input flowpath, such as when backflushing components of a sample or contaminants from the column out through the split flowpath. In the carrier gas identification examples described throughout the application, the column flowpath can function as an output flowpath The pneumatic system 200 can include a variety of sensing devices and valves for monitoring and controlling parameters (e.g., flow, pressure, etc.) within the pneumatic system. For example, some flowpaths of the pneumatic system (e.g., the carrier gas flowpath 205, the septum purge flowpath 225, the split flowpath 220, etc.) can include at least one valve (e.g., valve 230, valve 235, valve 240, etc.). Each valve can control whether the respective flowpath is connected (e.g., open) or disconnected (e.g., closed) to the other components of the pneumatic system 200 or to the carrier gas source or ambient environment. Each valve can be a switching valve, a proportional valve, and the like. In some cases, the column flowpath of the pneumatic system does not contain a valve.

Further, various sensors can be coupled to the flowpaths in the pneumatic system 200. The flow sensors may be various types known to those in the art. Typical flow sensors used for flowpaths of pneumatic systems require knowledge of the type of gas flowing through the sensor in order to correctly determine the flow rate of the gas. For example, the flow sensor may be a thermal dispersion flow sensor, which uses thermal conductivity of the gas to measure flow by providing a heat source to heat the flowing gas and measures the temperature differential upstream and downstream of the heater. The temperature differential between the two sensors is proportional to the flow rate of the gas and thermal conductivity of the gas. In another example, the flow sensor can be at least one pressure sensor upstream and/or downstream of a flow restriction, such as a frit, tubing, channel in a manifold, orifice, etc. The restriction may alternatively be a GC column. In one embodiment, the flow sensor can include one pressure sensor upstream of the restriction and be open to ambient pressure downstream of the restriction. This type of flow sensor measures flow rate by relating the pressure drop over the restriction to flow rate of the gas using the viscosity of the gas and internal dimensions and/or geometry of the restriction. A temperature sensor may indicate the temperature of the gas in order to find the viscosity of the gas for use in calculating the flow rate from the pressure drop.

Other types of flow sensors that can be utilized can include Coriolis, ultrasonic, and vortex shedding sensors, among others.

The flow sensors can output a flow measurement signal indicative of the flow rate of the gas. This can be in the form of a raw voltage or current, or alternatively a digital representation of a signal that can be singly or jointly related to the flow rate of the gas through calibration data. This will be referred to as a flow measurement signal (raw electrical output).

The flow measurement signal can also include the flow rate of the gas (e.g., in mL/min, etc.) after converting the raw electrical output of the flow sensor into a flow rate using calibration information. This will be referred to as a flow measurement signal (flow rate). If used alone, flow measurement signal can refer to either raw electrical output or flow rate.

In the two examples provided here, the flow measurement relies on gas properties, such as thermal conductivity or viscosity. Therefore, the type of gas must be known to determine the flow rate of the gas. The system can be calibrated for different gas types. For example, a calibration gas can be flowed through the system. The calibration gases can be of known compositions, such as Helium, Hydrogen, Nitrogen, or Argon-Methane, which are typical gases used by a GC system. The system can flow each gas through the flow sensor(s) at a known flow rate measured by an independent flow sensor and obtain flow measurement signals for each flow rate. The system can store these measurements corresponding to the calibration gas.

As an example, a flow sensor (e.g., flow sensor 245) can be coupled to the carrier gas flowpath 205 and can generate flow measurement signals for the flow through the carrier gas flowpath 205 and/or other components of the pneumatic system 200. A flow sensor (e.g., pressure sensor 250 coupled with frit 270) can be coupled to the septum purge flowpath 225. It can be assumed that septum purge flowpath opens to ambient pressure or an additional pressure sensor (not shown) can be located downstream of frit 270. A flow sensor (e.g., pressure sensor 255 coupled with column 280) can be coupled to the column flowpath 290. It can often be assumed that the column 280 opens to ambient pressure or vacuum depending on what detector 285 is fluidically connected to the outlet of the column 280 or an additional pressure sensor (not shown) can be located downstream of column 280. A column temperature control device can indicate a temperature of the column, which can be further utilized for determining the viscosity of the flowing gas. In other cases, the column flow at a measured pressure from the pressure sensor 255 may be difficult or impossible to calculate due to unknown or changing conditions at the distal end (outlet) of the column, or if the column is not a capillary column but is instead a packed column. An advantage of some embodiments described in the application is the ability to determine the gas type without the need for a precise model for the column flow. Further, the flow sensors depicted herein are merely examples, and other types or combinations of flow sensors may be used.

The flowpaths of the pneumatic system can also include microchannels, flow restrictors, tubing, and the like. The microchannels and flow restrictors can restrict gas flow through the corresponding flowpath, as well as pressure and flow rates of other components downstream and/or upstream. For example, the carrier supply flowpath 205 can include a frit 265, and the septum purge flowpath 225 can include a frit 270. In some cases, valves 230, 235, 240, etc., can also act as a flow restrictor, for example if a valve is a proportional valve. Additionally, the column(s) and/or other fluidic components coupled to the column flowpath may serve as restrictions that affect flow through the column flowpath.

A pneumatic system composed of sensors, proportional valves, and pneumatic restrictions can be used (with an electronic closed-loop controller) to control the gases into and out of the inlet. For example, the flow sensor 245 and proportional valve 235 can be used to control flow into the inlet with the pressure sensor 255 measuring the resulting column pressure. Alternatively, the pressure sensor 255 may be used in a closed-loop manner with the same valve 235 to control the pressure at the head of the column 280. In this case, the pneumatic system is effectively controlling the flow out of the inlet (column flow) by controlling the pressure across a restriction (the column) and the resulting flow in 205 is measured by the flow sensor 245. In a similar manner (pressure across a restrictor), the septum purge path (240, 250, 270) forms a flow controller for an additional path out of the inlet. It is important to note that, based on the Ideal Gas Law, if the pressures in the pneumatic system are static, that the sum of actual flows into the inlet must equal the sum of the actual flows out of the inlet. In some cases, the split path 220 may or not be included in outlet flow determinations by opening or closing the split path 220 to the column (e.g., via valve 230). Further, in some cases, whether the split path 220 is used in outlet flow determination can be based on whether a flow sensor is coupled to the split path 220

The pneumatic system shown in FIG. 2 is one embodiment of a pneumatic system and is representative of what is known as a split/splitless ("SSL") Inlet. In split mode, the inlet can have the valve 230 open and split the sample exiting the pneumatic system between the split flowpath and the column flowpath. In splitless mode, the valve 230 may be closed, and all of the sample injected into the inlet exits through the column flowpath. While a preferred embodiment of this invention is with the inlet in the splitless mode so that the unknown split path 220 flow rate is zero, it can be appreciated that the gas type can optionally be determined in the split mode at lower split flows so that the error in the summing equation "flow in =sum of flows out" is minimal. Multiple types of inlets exist, including multimode inlets (MMI), cool-on-column (COC) inlets, and volatiles inlet (VI), among others. These inlets may have different input and output flowpaths and/or different combinations of valves and flow sensors on the flowpaths. For example, a COC inlet may not have a split flowpath, but all have multiple flow paths out of the inlet (column flow, septum purge flow) and a flow sensor 245 on the incoming flow, so that comparison of total inlet flow to total outlet flow can be evaluated.

Column

Separation of the sample components can occur in the column of the gas chromatography system, such as the column 135 of FIG. 1. The column 135 can contain material that is not vaporized and that interacts with different sample components differently (e.g., a stationary phase). The interactions can be physical in nature (e.g., adsorption, "solvation," sieving, and the like) rather than chemical. An exemplary column can be a capillary tube (e.g., 5 to 100 m long, 0.1 to 0.5 mm in diameter) with a coating of a suitable polymer film on its walls. The column can also contain particles that can interact with the sample either directly or due to a coating on the particles. In either case, as the sample components go through the column, some components can interact more strongly than others with the stationary phase and are retained for longer times. The sample components thus are carried by the carrier gas to the detector end of the column 135 with different exit times depending on the differences in interaction with the stationary phase. Further, the GC system may have one or more columns connected in series or parallel. The columns may also be connected to other sources of gas flow at one or more points along the length of the column to alter the flow through the column.

Column Temperature Control

Because the interaction with the column is a physical interaction, the interaction can be adjusted by controlling the temperature of the column 135 (e.g., via a column temperature control device 140). In some samples, some components can interact minimally with the column 135 at a given temperature, while other components can be retained indefinitely at that same temperature. Thus, the column temperature control device 140 can control the column temperature in a controlled (and repeatable) way while the sample components are migrating through the column 135. Given the nature of the physical interactions, this temperature control can involve increasing the temperature of the column 135 during sample elution. When the last component has eluted from the column, the temperature can be returned to the starting temperature before the next sample is introduced. For some samples, a desired starting temperature can be below room temperature, for some samples the desired starting temperature can be at or near room temperature, and for other samples, the desired starting column temperature can be higher than room temperature. In some cases, the column temperature control device may be a convection oven. In other cases, the column temperature control device may be a conductive heating apparatus.

Detector

The separated components of the sample can be received or identified by a detector 145. The detector 145 can provide a change in an electrical signal when some or all sample components elute from the column 135. Some detectors can use physical properties of the molecules to distinguish between different molecules. An exemplary type of detector is a thermal conductivity detector. Thermal conductivity detectors monitor the thermal conductivity of the gas passing through the detector. If the thermal conductivity of a sample component is different from that of the carrier gas, a signal can be generated. Other detectors can rely on a chemical reaction to generate a new species that can provide an electrical signal. Some detectors can rely on an ionization process, where the carrier gas is not ionized and sample molecules are ionized. The ionization can be measured as an electrical signal, in some cases by collecting the ions and monitoring the ion current. There are also some detectors that can cause sample molecules to convert to an excited form that then emits a photon. The photons can be detected using a device such as a photomultiplier tube in which the photons are converted to an electrical signal. Detectors can also involve additional gases either as reactants or as sweep flows. Control of these gases can be accomplished by an electromechanical system. In some embodiments, the GC system may include more than one detector.

Signal Processor & Data Analyzer

A signal processor 150 can receive electrical signals generated by the detector 145, and process the signal. A data analyzer 155 can convert the gas chromatography signals received from the signal processor 150 into compound identification and calibrated amounts. The data analyzer may be onboard the GC system or reside externally in a computer.

Input/Output Device

The input/output device 165 can receive input for and/or display output from, the gas chromatography system. The input/output device 165 can be analog switches or a keyboard and display or a touchscreen. Alternatively, set point input and system monitoring can occur via an external computer with appropriate software.

Control System

Control system 160 can be an electronic device programmed to control the operation of the gas chromatography system to achieve a desired result. The control system 160 can be programmed to autonomously carry out a gas chromatography regimen without the need for input (either from feedback devices or users) or can incorporate such inputs. The principles of how to use feedback (e.g., from a temperature sensor) in order to modulate operation of a component are described, for example, in Karl Johan Astrom & Richard M. Murray, Feedback Systems: An Introduction for Scientists & Engineers (2008).

Figure 12:
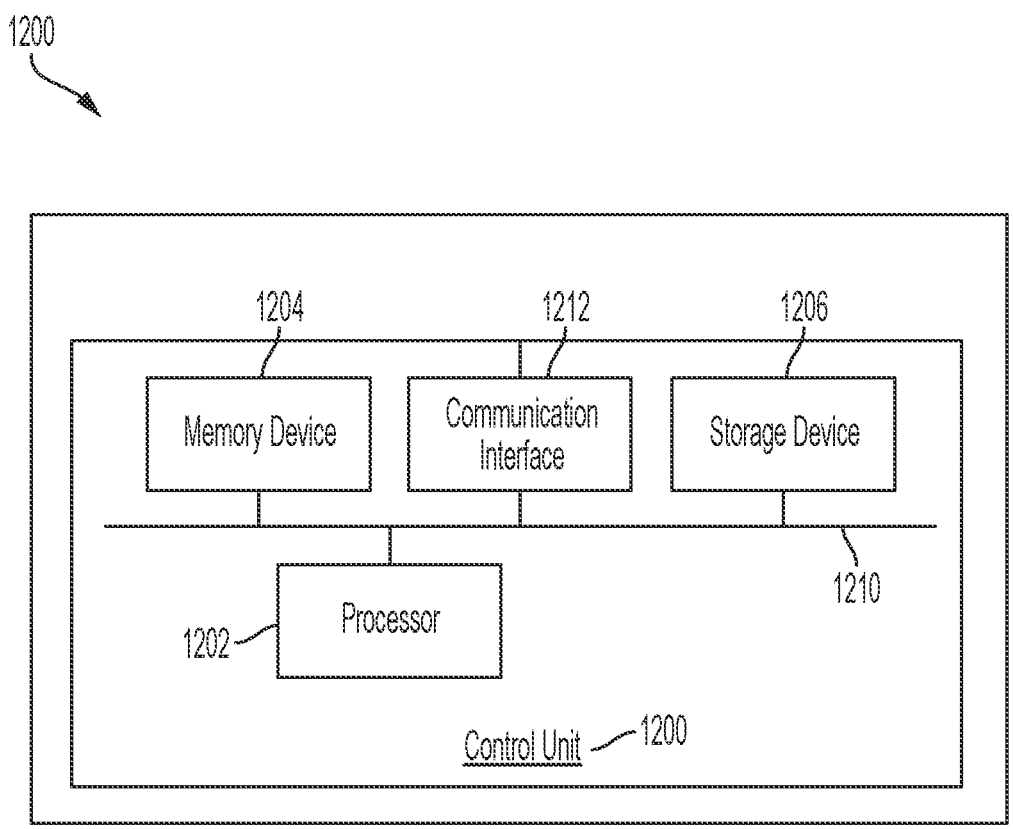
FIG. 12 depicts a control system for a gas chromatography system according to an embodiment of the claimed invention.

Control system 160 can be a computing device such as a microcontroller (e.g., available under the ARDUINO® OR IOIO™ trademarks), general purpose computer (e.g., a personal computer or PC), workstation, mainframe computer system, and so forth. An exemplary control system is illustrated in FIG. 12. The control system ("control unit") 1200 can include a processor device (e.g., a central processing unit or "CPU") 1202, a memory device 1204, a storage device 1206, a system bus 1210, and a communication interface 1212.

Processor 1202 can be any type of processing device for carrying out instructions, processing data, and so forth.

Memory device 1204 can be any type of memory device including any one or more of random access memory ("RAM"), read-only memory ("ROM"), Flash memory, Electrically Erasable Programmable Read Only Memory ("EEPROM"), and so forth.

Storage device 1206 can be any data storage device for reading/writing from/to any removable and/or integrated optical, magnetic, and/or optical-magneto storage medium, and the like (e.g., a hard disk, a compact disc-read-only memory "CD-ROM", CD-ReWritable "CDRW", Digital Versatile Disc-ROM "DVD-ROM", DVD-RW, and so forth). Storage device 1206 can also include a controller/interface for connecting to system bus 1210. Thus, memory device 1204 and storage device 1206 are suitable for storing data as well as instructions for programmed processes for execution on processor 1202.

Communication interface 1212 can be adapted and configured to communicate with any type of external device, or with other components of the gas chromatography system. For example, double-lined arrows, such as arrow 175, illustrate electronic communication between the control system 160 of FIG. 1 and another component of the gas chromatography system. Communication interface 1212 can further be adapted and configured to communicate with any system or network, such as one or more computing devices on a local area network ("LAN"), wide area network ("WAN"), the Internet, and so forth. Communication interface 1212 can be connected directly to system bus 1210 or can be connected through a suitable interface.

Control system 1200 can, thus, provide for executing processes, by itself and/or in cooperation with one or more additional devices, that can include algorithms for controlling components of the gas chromatography system in accordance with the claimed invention. Control system 1200 can be programmed or instructed to perform these processes according to any communication protocol and/or programming language on any platform. Thus, the processes can be embodied in data as well as instructions stored in memory device 1204 and/or storage device 1206 or received at communication interface 1212 for execution on processor 1202.

Carrier Gas Identification

Properly identifying the carrier gas entering the GC system is critical for correctly identifying the identity and/or relative amounts of analytes in a sample. As mentioned above, the flow sensors in a pneumatic system may require knowledge of the type of carrier gas being used in order to properly control the flow of gases through the system. Different carrier gases may have different viscosities and different thermal conductivities or other properties and, therefore, generate different flow measurement signals (raw electrical output) for the same actual flow rate and/or require different flow sensor calibration data. In order to properly control the flow of gas through the GC system, it is necessary to know the type of gas being used.

As an example of the importance of maintaining proper flow through the GC system, the flow through the column affects the retention time of an analyte, peak shape, and/or separation ability of the column. Having an incorrect flow rate could, therefore, result in improperly identified or quantified analytes. Additionally, when used in the split mode of operation of the SSL inlet, the relative flow through the column and the split vent may affect the percentage of sample that enters the column for analysis. Having an incorrect split ratio could affect quantization accuracy of the analyte by having too much or too little of the sample enter the column.

In existing GC systems, a user is expected to input the type of carrier gas being used by the GC system, for example, using input/output device 165 of FIG. 1. This is prone to user error. A user may enter the gas they intend to use for their analysis into the input/output device 165 but connect the incorrect gas to the carrier supply port 210. Alternatively, the user may connect the gas they intend to use for their analysis to the carrier supply port 210 but enter the incorrect gas into the input/output device 165. Having the GC system identify the carrier gas flowing into the pneumatic system would eliminate these issues.

Input/Output Flow Measurement Signal Comparison

Methods described herein can identify the type of the carrier gas by comparing the flow measurement signals from multiple flow sensors utilizing different gas properties in the pneumatic system. In particular, the methods described herein can, in some cases, be implemented by hardware already relied upon by conventional gas chromatography systems (e.g., gas chromatography system 100 of FIG. 1), such that this hardware is repurposed or reconfigured to execute the methods described herein.

As discussed earlier, gas laws such as the Ideal Gas Law, when applied to a system at static pressures, constrains the actual (true) mass flow entering any point in the system to be the same as the actual (true) mass flow out of that point. Otherwise, the pressure at that point would be increasing or decreasing.

When applied to a pneumatic system of at least one input flow path and two or more output flow paths, as found in the inlet portion of the GC pneumatic system, the sum of all input flow must equal the sum of all the output flows. This is analogous to Kirchoff's law for electronic circuits stating that the sum of all currents entering and exiting a node must be equal. For a split/splitless inlet with one input flowpath and three output flowpaths such as that shown in FIG. 2, this means: carrier gas supply flow=column flow+septum purge flow+split flow.

Flow sensors of different types (utilizing thermal diffusivity, pressure across restriction, and the like to measure flow) will both have errors in the flow measurement signal (flow rate) if the actual gas differs from the configured gas, but more importantly, the error will be different for the different flow sensor types. This disagreement can be used to determine if the current gas is not the configured gas and can, in some cases, be used to determine the gas type (from among different calibrated gases).

Alternatively, using the same principle, errors in the flow measurement signal (raw electrical output) can be used to determine that the current gas is not the calibrated gas and can, in some cases, be used to determine the gas type (from among different calibrated gases).

The gas chromatography system can sense a flow measurement signal or signals of a gas inputted into the pneumatic system on an input flowpath as well as at least one output flow measurement signal on an output flowpath of the inlet, where the pneumatic system has at least two output flowpaths. The output flowpaths with or without a flow sensor may be closed with substantially no flow going through them (e.g., their value in the summing equation is zero). By monitoring input and output flow measurement signals of the flowpaths in the inlet, the gas chromatography system can determine the type of gas flowing through the pneumatic system and/or determine whether the system is properly configured for the actual gas. In some cases, the system can further identify the actual gas type from the input and output flow measurement signals.

The pneumatic system flows gas through the input flowpath(s) and output flowpath(s) and records the flow measurement signals on the flow sensors. At least one flow sensor on the input flowpath can be of a different type than at least one flow measurement sensor on an output flowpath. Stated otherwise, a flow measurement sensor on an input flowpath can utilize a different property to generate a flow measurement signal than at least one flow sensor on an output flowpath. For example, a flow sensor on an input flowpath could be a thermal dispersion flow sensor utilizing thermal conductivity to measure flow, while a flow sensor on an output flowpath can be a pressure over a restriction utilizing viscosity to measure flow. For a thermal dispersion flow sensor, gases with different thermal conductivities will generate different responses from the flow sensor for the same flow rate. Additionally, for a flow sensor consisting of a pressure drop over a restriction, gases with different viscosities will generate different responses from the flow sensor for the same flow rate. Other types of flow sensors using different properties to measure flow are also contemplated.

The system can then compare the flow measurement signal(s) from the flow sensor(s) on the input flowpath(s) to the flow measurement signal(s) from the flow sensor(s) on the output flowpath(s) to identify the gas flowing through the pneumatic system. In cases of flow measurements or calculations, the system can compare flow measurement signal(s) (flow rate(s)) from the flow sensor(s) on the input flowpath(s) to the flow measurement signal(s) (flow rate(s)) from the flow sensor(s) on the output flowpath(s) to identify the gas flowing through the pneumatic system. Due to at least one of the flow sensors on the input flowpath utilizing a different property to measure flow than one of the flow sensors on the output flowpath, the GC system is able to identify gases based on differences in responses of the flow sensors to the gases with different properties based on whether or not the flow measurement signals from the flow sensors on the input and output flowpaths agree. Agreement means that the flow measurement signals on the input and output flowpaths, coupled with knowledge about any output flowpaths that do not have flow measurement signals, indicate that the same amount of gas is flowing out of the system as is flowing in the system.

As an example, Nitrogen and Helium, two commonly used carrier gases, have similar viscosities, therefore, the response of a viscosity-based flow sensor (e.g. a pressure sensor over a restriction) may be indistinguishable for these two gases for the same actual flow rate of gas, depending on the resolution of the sensor. However, Nitrogen and Helium have different thermal conductivities. The response of a thermal dispersion flow sensor to Nitrogen and Helium would be different. In this respect, if Helium was flowing through the pneumatic system, the flow measurement signals for a thermal dispersion flow sensor on an input flowpath and a viscosity-based flow sensor on an output flowpath would agree (e.g., indicate the same amount of flow into the system as is exiting the system) for Helium as the configured gas, but not for Nitrogen as the configured gas. Based on this comparison, it could be determined that Helium is the gas flowing through the pneumatic system.

In determining agreement between the input and output flow measurement signals, the pneumatic system may be configured for a gas, meaning that it may be assumed that a type of carrier gas is flowing through the pneumatic system (i.e. the configured gas), with that carrier gas being one of the calibrated gases. The flow measurement signals may be compared by using a look-up table, equation, or other method that relies on the calibration data for the configured carrier gas. If the flow measurement signals agree (e.g., the flow measurement signal(s) on the input flowpaths(s) indicate that the amount of flow entering the pneumatic system is the same as the amount of flow exiting the inlet as indicated by the flow measurement signal(s) on the output flowpaths), then the configured gas is correct. More specifically, the sum of the flow measurement signal(s) (flow rate) on the input flowpath(s) can be compared to the sum of the flow measurement signal(s) (flow rate) on the output flowpaths for the configured gas. If they match (e.g., are substantially the same within typical measurement error), the configured gas is the type of gas flowing through the pneumatic system.

If the flow measurement signals do not agree, then the pneumatic system may be configured for another gas, and the process of comparing flow measurement signals may be repeated. Alternatively, the difference between the flow measurement signals on the input and output flowpaths for the incorrectly configured gas can be used in identifying the gas flowing through the pneumatic system.

As another example, the pneumatic system may not be configured for a gas. In this case, the flow measurement signal(s) on the input flowpath(s) can be compared to the flow measurement signal(s) on the output flowpaths. A lookup table or equations matching the flow measurement values to a calibrated carrier gas can indicate the type of carrier gas flowing through the pneumatic system.

Input/Output Flow Measurement with Septum Purge Flow Off

Figure 3:
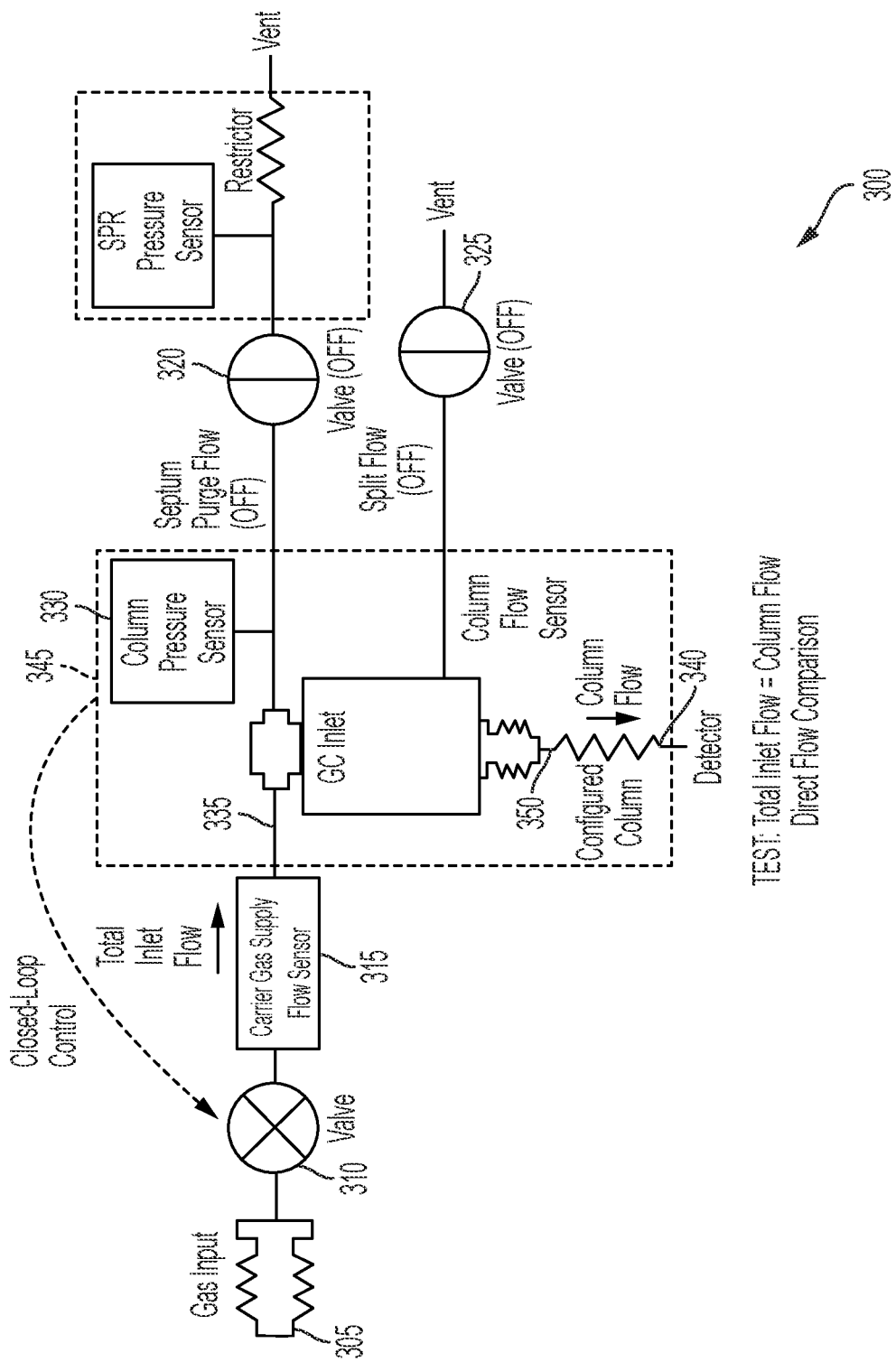
FIGS. 3-11 illustrate pneumatic system configurations for identifying a gas in a gas chromatography system according to embodiments of the claimed invention.

In one embodiment, the gas chromatography system can monitor flow measurement signals from sensors on both the gas input flowpath 335 and the column flowpath 340. FIG. 3 illustrates a pneumatic system 300 configured for identifying a carrier gas according to an embodiment of the claimed invention. The pneumatic system 300 can be configured to flow a gas into the inlet through the gas supply port 305. The gas chromatography system can configure the valve 310 on the input flowpath to be open (e.g., proportionally open). The gas can flow through the valve 310 and through the carrier gas supply flow sensor 315. The carrier gas supply flow sensor 315 can generate a flow measurement signal corresponding to a property (e.g., thermal conductivity, viscosity, and the like) of a gas flowing into the inlet.

The system can further configure both the septum purge flowpath and the split flowpath to be closed. For example, the system can configure the valves 320 and 325 to be closed. Thus, the system can limit the flow output for the pneumatic system to be through the column flowpath. The column flow sensor 345 can generate flow measurement signals corresponding to a property of the flowing gas (e.g., viscosity, thermal conductivity, and the like) and representative of gas flowing out of the inlet (e.g., via the column flowpath). The carrier gas supply flow sensor 315 and the column flow sensor 345 can utilize different properties to generate the flow measurement signals (e.g. the carrier gas supply flow sensor 315 may be a thermal dispersion flow sensor and the column flow sensor 345 may be the column pressure sensor 330 measuring pressure over the column restriction 350, e.g., a viscosity-based flow sensor). The GC system can identify the carrier gas type flowing through the inlet by comparing the flow measurement signals from the carrier gas supply and column flow sensors as described above. In some cases, knowledge pertaining to the lack of gas flow in the closed flowpaths (e.g., the septum purge flowpath and the split flowpath) can also be taken into consideration when identifying the carrier gas type.

Figure 4:
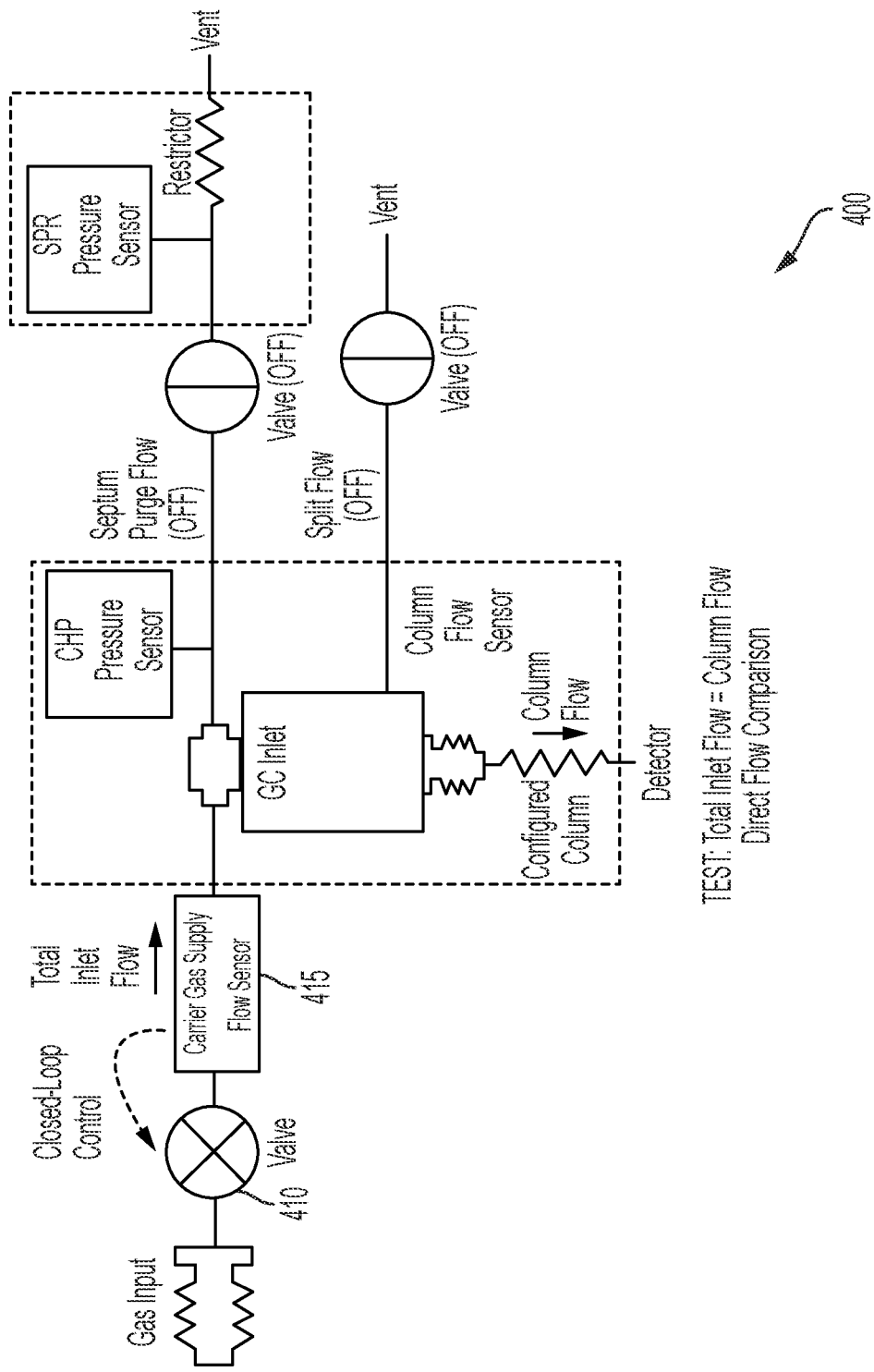

FIG. 4 illustrates a pneumatic system configured for identifying a carrier gas, according to an embodiment of the claimed invention. The pneumatic system 400 can function in similar ways as the pneumatic system 300 depicted in FIG. 3 and explained above. However, in the pneumatic system 300, the valve 310 can be controlled and configured based on measurements received from the second flow sensor 330, whereas the valve 410 in the pneumatic system 400 can be controlled and configured based on measurements received from the carrier gas supply flow sensor 415. These closed-loop feedback systems are described in more detail below.

Input/Output Flow Rate Comparison with Column and Septum Purge On

Figure 5:
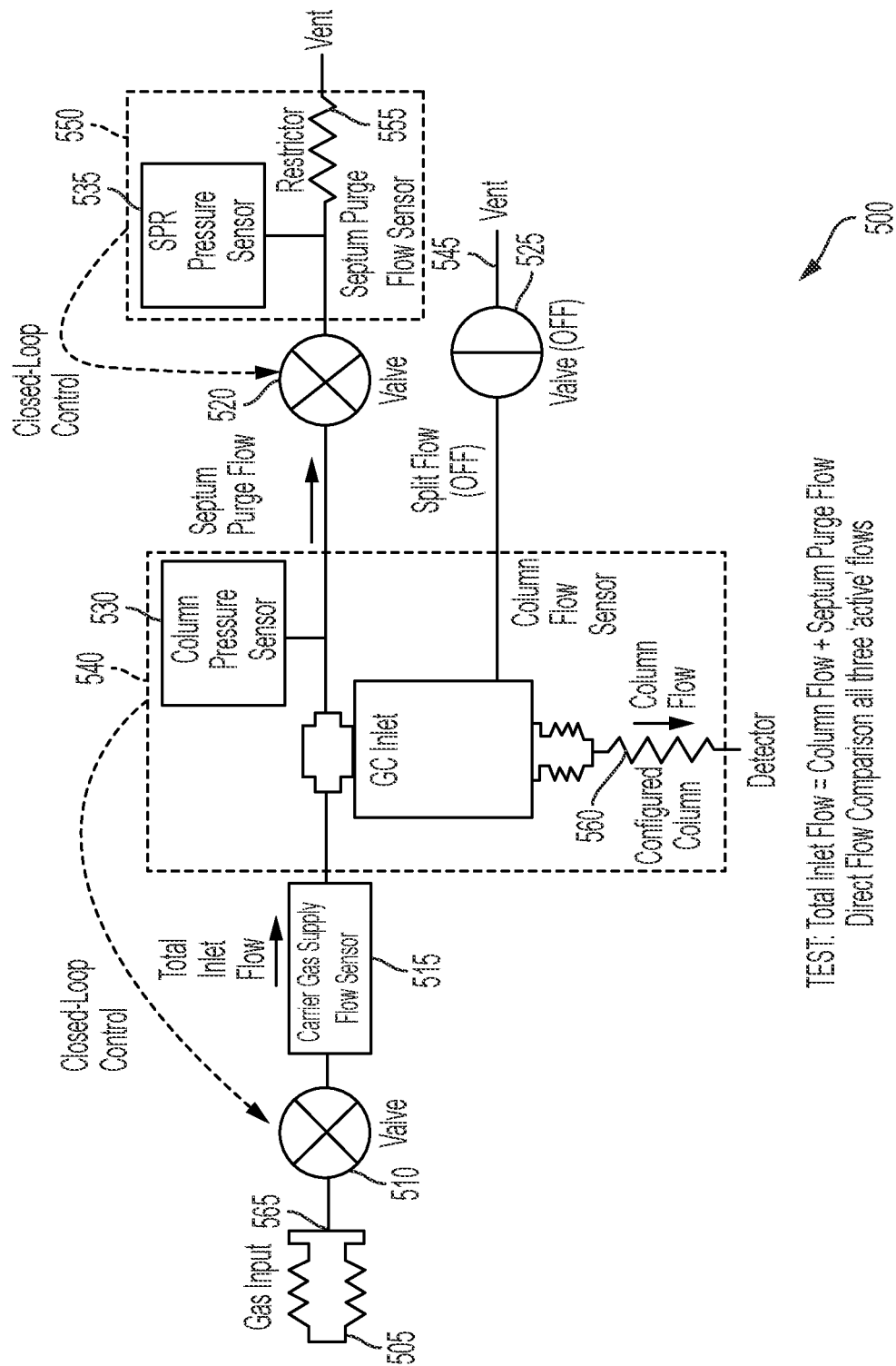

In another embodiment, the gas chromatography system can monitor flow measurement signals from the gas input flowpath, the column flowpath, and the septum purge flowpath. FIG. 5 illustrates a pneumatic system 500 configured for identifying a carrier gas, according to an embodiment of the claimed invention. The pneumatic system 500 can be configured to flow a gas into the inlet through the gas supply port 505. The gas chromatography system can configure the valve 510 on the input flowpath 565 to be open (e.g., proportionally open). The gas can flow through the valve 510 and through the carrier gas supply flow sensor 515. The carrier gas supply flow sensor 515 can generate flow measurement signals corresponding to a property of the gas flowing into the pneumatic system 500.

The system can further configure the output split flowpath 545 to be closed. For example, the system can configure the valve 525 on the split flowpath 545 to be closed, thereby limiting flow output of the gas to be through the column flowpath and the septum purge flowpath (e.g., through an open valve 520 to the septum purge flowpath). A combination of the septum purge flow sensor 550 (e.g., the pressure sensor 535 and the restriction 555) and the column flow sensor 540 (e.g., the pressure sensor 530 and the column restriction 560) can generate flow measurement signals for the gas flowing out of the inlet (e.g., via the column flowpath and the septum purge flowpath) corresponding to other properties of the gas. At least one of the septum purge flow sensor 550 and the column flow sensor 540 can utilize different properties of the flowing gas to generate the flow measurement signals compared to the other flow sensors in the pneumatic system. For example, the carrier gas supply flow sensor 515 may be a thermal dispersion flow sensor while at least one of the septum purge flow sensor 550 and/or column flow sensor 540 may be a viscosity-based flow sensor.

The system can sense flow measurement signals from the flow sensors on the input and output flowpaths. For example, a microcontroller of the system can receive sensed signals from the carrier gas supply flow sensor 515, the septum purge flow sensor 550, and the column flow sensor 540. In some cases, the microcontroller can be a part of the control system 160 of FIG. 1. The system can then compare the flow measurement signals generated from the carrier gas supply flow sensor 515 with the flow measurement signals originating from the septum purge flow sensor 550 and the column flow sensor 540 (e.g., comparing the summation of flow measurement signals (flow rates) of the septum purge and column flow sensors to the flow measurement signal (flow rate) of the carrier gas supply flow sensor). From this comparison, the system can determine whether the inlet is correctly configured for the flowing gas (e.g., if the summation of the flow measurement signals (flow rates) of the septum purge and column flow sensors is substantially equal to the flow measurement signal (flow rate) of the carrier gas supply flow sensor, then the configured gas is the gas flowing in the pneumatic system). Additionally, or alternatively, the system can identify the gas type of the flowing gas from the comparison.

Figure 6:
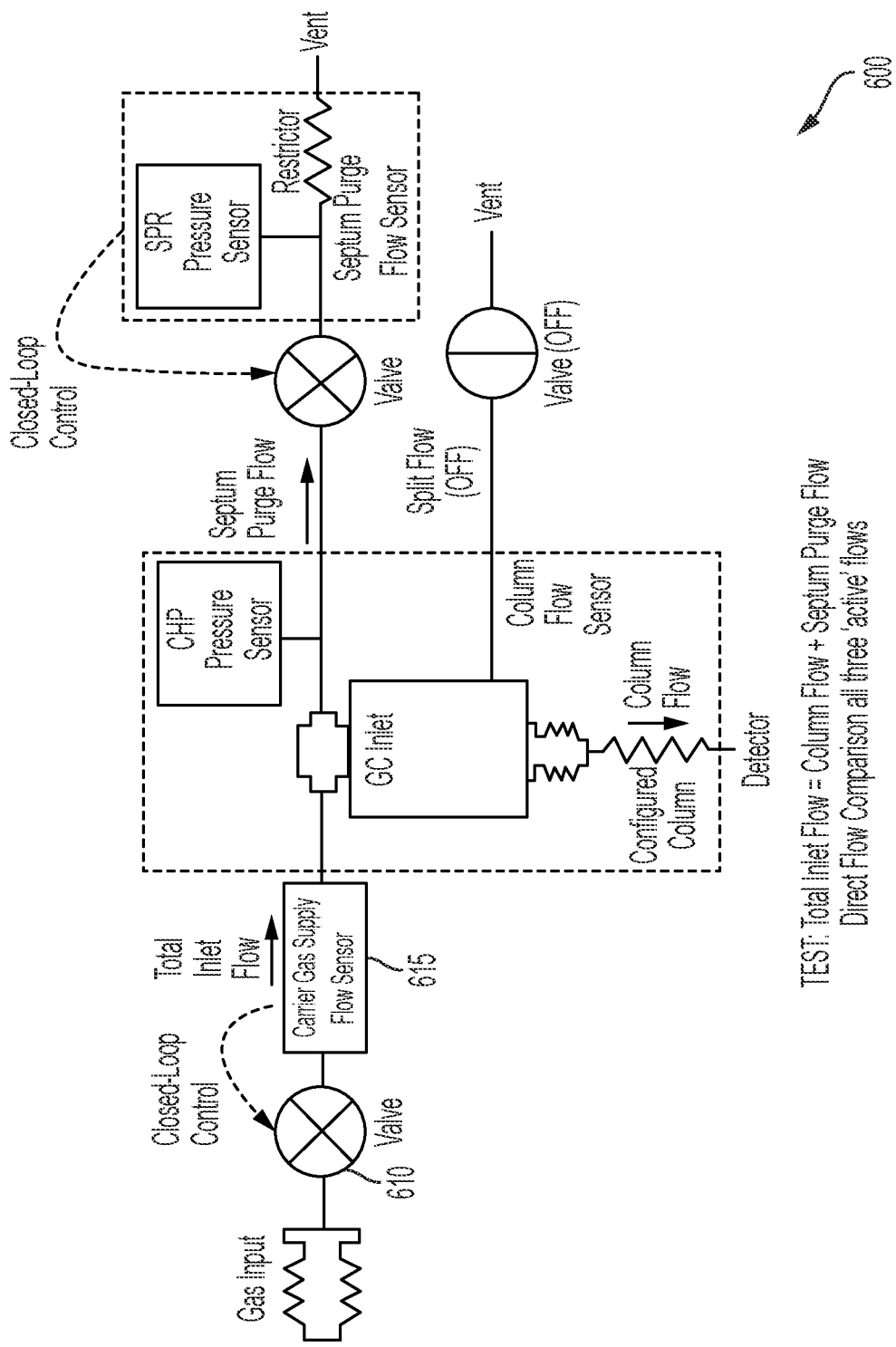

FIG. 6 illustrates a pneumatic system 600 configured for identifying a carrier gas, according to an embodiment of the claimed invention. The pneumatic system 600 can function in similar ways as the pneumatic system 500 depicted in FIG. 5 and explained above. However, in the pneumatic system 500, the valve 510 can be controlled and configured based on measurements received from the column flow sensor 540, whereas the valve 610 in the pneumatic system 600 can be controlled and configured based on measurements received from the carrier gas supply flow sensor 615. These closed-loop feedback systems are described in more detail below.

Input/Output Flow Rate Comparison Using Delta Measurement with Column Flow Constant The aforementioned gas type identification methods require the determination of the column flow measurement signal. For simple chromatographic systems, this may be sufficient, but for packed columns or a more-complex system as previously described (e.g., the outlet end of the column can be to a vacuum, switching valve, another pressure regulator, etc.) the column flow measurement signal may not be accurate, known to the gas chromatography system, and/or easy to model. Additionally, errors in the flow measurement signals of any of the flow sensors due to drift, thermal effects, etc. can lead to errors in the direct comparison of the flow measurement signals and, therefore, reduce the ability to identify the type of calibrated gas.

An extension of the above methods can be used to eliminate these shortcomings by utilizing a method that does not rely on the original value of the column flow and zeroes-out errors in sensors that may have drifted in their flow-measurement signal. This is accomplished by making a change in one or more of the controlled input or output flows and monitoring the resulting changes in the flow-measurement signals from the remaining path(s). In this way, the original flow measurement signals (including from the column flowpath) are effectively zeroed-out as the gas type determination is based only on the flow measurement signal changes in each path (i.e. a Delta measurement).

Figure 7:
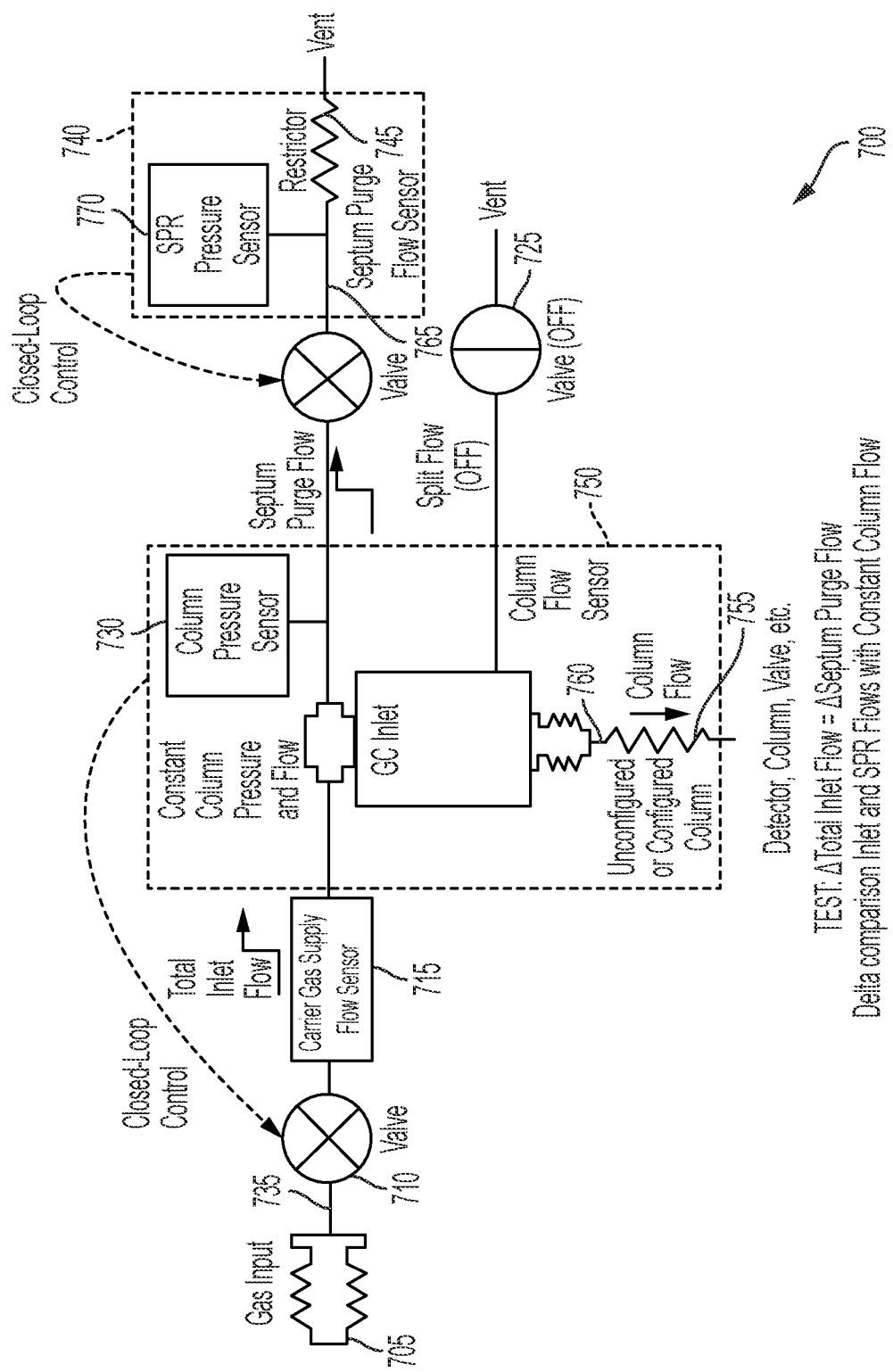

In one embodiment, the gas chromatography system can monitor step changes in flow measurement signals from both the gas input flowpath and the septum purge flowpath. FIG. 7 illustrates a pneumatic system 700 configured for identifying a carrier gas, according to an embodiment of the claimed invention. The pneumatic system 700 can be configured to flow a gas into the inlet through the gas supply port 705. The system 700 can configure the valve 710 on the input flowpath 735 to be open (e.g., proportionally open), thereby flowing gas through the valve 710 and through the carrier gas supply flow sensor 715, wherein the carrier gas supply flow sensor can generate flow measurement signals utilizing a property of the flowing gas (e.g., thermal dispersion). The carrier gas supply flow sensor 715 can generate a first flow measurement signal.

The system 700 can further configure the split flowpath to be closed. For example, the system can configure the valve 725 to be closed. Thus, the system 700 can limit the flow output of the gas to be through the column flowpath and the septum purge flowpath. The septum purge flow sensor 740 (e.g., the pressure sensor 770 and the restriction 745) can generate a second flow measurement signal and, optionally, the column flow sensor 750 (e.g., the pressure sensor 730 and the column restriction 755) can generate a flow measurement signal. These two flow measurement signals are representative of gas flowing out of the inlet and at least the septum purge flow sensor utilizes a property of the gas to measure flow that is different than that of the carrier gas supply flow sensor (e.g., viscosity using a pressure over a restriction to measure flow).

In some cases, the system can maintain constant gas flow in a subset of the flowpaths of the system. For example, the system can maintain a constant flow rate in the column flowpath. By keeping the flow rate in the column flowpath constant, the system only requires flow measurement signals from flowpaths experiencing variable flow rates. This can be beneficial at least in part because the column flowpath of the above example does not require a flow rate sensor. Rather, the system may monitor the column flowpath for constant flow rate, which can be indicated through monitoring pressure of the flowpath (e.g., via a pressure sensor).

The system 700 can receive flow measurement signals from the input and output flowpaths. A microcontroller of the system can receive sensed signals from the carrier gas supply flow sensor 715 and the septum purge flow sensor 740. In some cases, the column flow sensor 750 can maintain flow through the column flowpath 760 constant. From these sensed signals, the microcontroller can determine flow measurement signals for the gas flowing in the pneumatic system.

The system 700 can then alter the flow rate of gas originating from the gas supply port 705 via a change to the flow rate through the septum purge flowpath 765. Further, the system 700 can configure the flow rate through the column flowpath to remain substantially constant (e.g., near zero change), so that the flow rate experienced by the column flowpath remains static even as the gas supply port flow rate increases.

The system can then determine new flow measurement signals from the input and septum purge flowpaths. The carrier gas supply flow sensor 715 can generate a third flow measurement signal, and the septum purge flow sensor 740 can generate a fourth flow measurement signal. The microcontroller of the system can receive sensed signals from the carrier gas supply flow sensor 715 and the septum purge flow sensor 740. From these sensed signals, the microcontroller can determine flow measurement signals for the gas flowing in the pneumatic system at the altered septum purge flow rate.

The system can then calculate a difference between the first set of flow measurement signals originating during the original gas supply port flow rate with the second set of flow measurement signals originating during the adjusted septum purge flowpath gas flow rate. For example, the system can calculate a first change in flow measurement signal by taking the difference between the first flow measurement signal originating from the carrier gas supply flow sensor 715 and the third flow measurement signal originating from the carrier gas supply flow sensor 715. Likewise, the system 700 can calculate a second change in flow measurement signal by taking the difference between the second flow measurement signal originating from the septum purge flow sensor 740 and the fourth flow measurement signal originating from the septum purge flow sensor 740.

The system can then compare the first change in flow measurement signal to the second change in flow measurement signal. From this comparison, the system can determine whether the inlet is configured for the actual gas. If the change in flow measurement signals (e.g., the deltas from the comparisons) is substantially the same (accounting for system calibration errors) the actual gas is the configured gas type. Additionally, or alternatively, the system can identify the gas type of the actual gas. In some cases, a look-up table can be stored (e.g., by the gas chromatography system or another remote system that the gas chromatography system has access to) that includes a set of equations. The flow measurement values can be inputted into these equations, which can be used to match the delta values between the sensors to identify a gas type for the carrier gas.

The following table 1 shows experimental results of just such a comparison. While the inlet was held at a fixed 10 psi column head pressure (i.e. no change in column flow), the flow rate setpoint for the septum purge (utilizing the septum purge sensor) was changed from 3 mL/min to 13 mL/min (a 10 mL/min change) and the resulting first change in flow measurement signal (flow rate) was determined on the carrier gas supply flow sensor (715 in FIG. 7) on the input path. For each of the 16 table entries the resulting change in input path flow measurement signal (flow rate) is shown in both absolute and percent error terms. Along the diagonal is where the configured gas was equal to the actual gas type, and the input path flow measurement signal (flow path) errors are all within the flow calibration error range of <10%. All values not along the diagonal are where the configured gas is not the same as the actual gas and the errors are large enough to not only determine the gas type is not configured correctly but can additionally be used to determine the correct calibrated gas type. For example, if configured for Helium and the error in the first flow sensor measurement signal change was in error by 100-140%, it could be determined that the actual gas was Hydrogen.

TABLE 1

| Actual Gas | Configured Gas Helium (He) | | | | Configured Gas Hydrogen (H2) | | | |
| --- | --- | --- | --- | --- | --- | --- | --- | --- |
| | Spr3 | Spr13 | delta | % error | Spr3 | Spr13 | delta | % error |
| Helium (He) | 2.6 | 12.1 | 9.5 | 5% | 1.1 | 5 | 3.9 | 61.0% |
| Hydrogen (H2) | 6.5 | 28.4 | 21.9 | −119% | 2.8 | 12.1 | 9.3 | 7.0% |
| Nitrogen (N2) | 12.7 | 67.9 | 55.2 | −452% | 3.6 | 27.1 | 23.5 | −135.0% |
| Argon-Methane (Ar—CH4) | 8.7 | 51.5 | 42.8 | −328% | 1.8 | 20 | 18.2 | −82.0% |

| Actual Gas | Configured Gas Nitrogen (N2) | | | | Configured Gas Argon-Methane (Ar—CH4) | | | |
| --- | --- | --- | --- | --- | --- | --- | --- | --- |
| | Spr3 | Spr13 | delta | % error | Spr3 | Spr13 | delta | % error |
| Helium (He) | 1 | 2.7 | 1.7 | 83.0% | 1.3 | 3.5 | 2.2 | 78.0% |
| Hydrogen (H2) | 1.7 | 5.4 | 3.7 | 63.0% | 2.2 | 7.1 | 4.9 | 51.0% |
| Nitrogen (N2) | 2.8 | 12.2 | 9.4 | 6.0% | 3.7 | 16 | 12.3 | −23.0% |
| Argon-Methane (Ar—CH4) | 2.1 | 9.4 | 7.3 | 27.0% | 2.8 | 12.3 | 9.5 | 5.0% |

Figure 8:
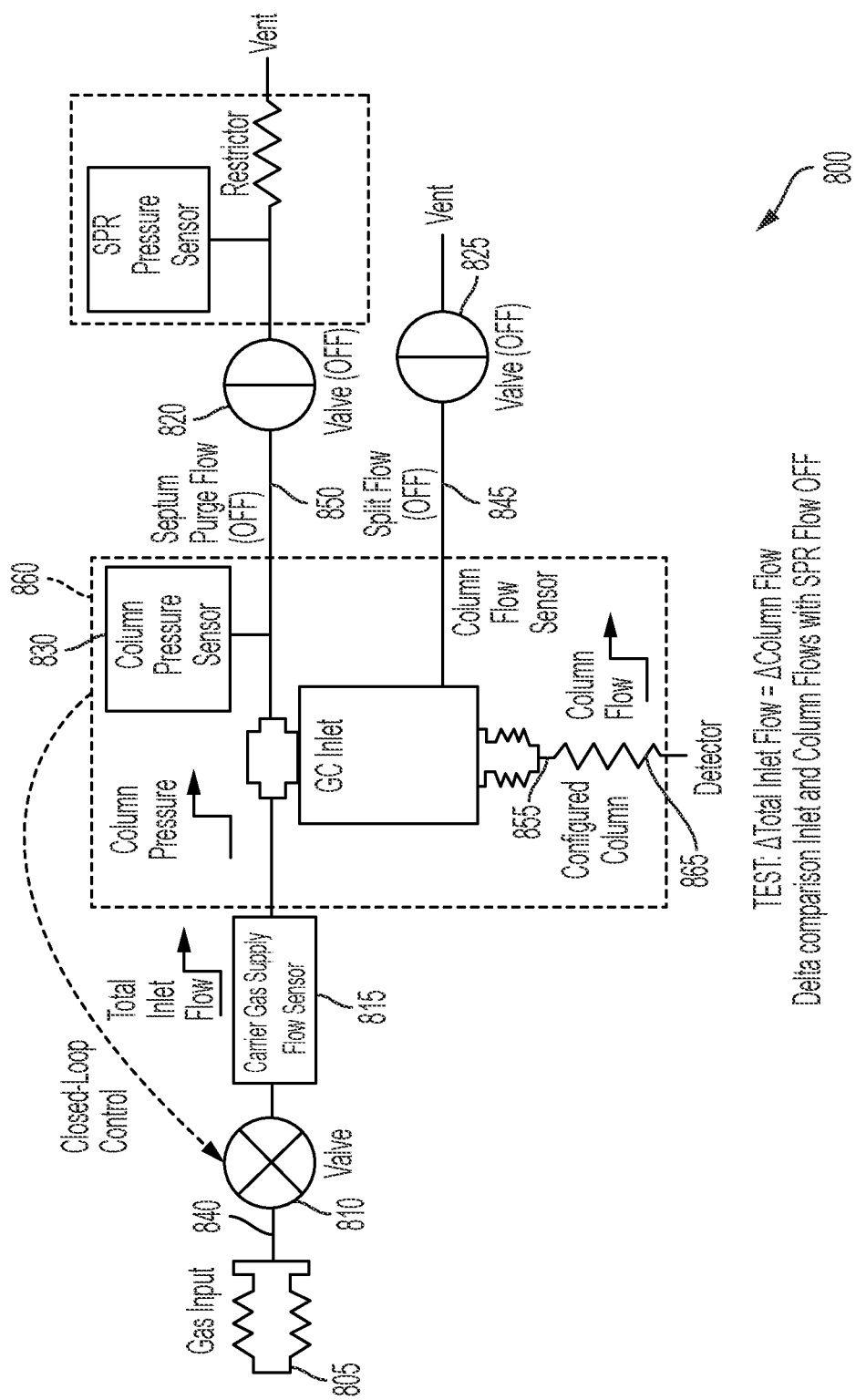

Input/Output Flow Rate Comparison Using Delta Measurement with Septum Purge Flow Off In one embodiment, the gas chromatography system can monitor changes in flow measurement signals from the gas input flowpath and the column flowpath. FIG. 8 illustrates a pneumatic system configured for identifying a carrier gas, according to an embodiment of the claimed invention. The pneumatic system 800 can be configured to flow a gas into the input flowpath 840 through the gas supply port 805. The pneumatic system 800 can configure the valve 810 on the input flowpath to be open, thereby flowing gas through the valve 810 and through the carrier gas supply flow sensor 815, where the carrier gas supply flow sensor 815 can generate flow measurement signals corresponding to a property of the flowing gas.

The system 800 can further configure the split flowpath 845 and the septum purge flowpath 850 to be closed. For example, the system can configure the valve 820 and the valve 825 to be closed. Thus, the system 800 can limit the flow output of the gas to be through the column flowpath 855. The column flow sensor 860 (e.g., the pressure sensor 830 and the column restriction 865) can generate flow measurement signals for the gas flowing out of the inlet and corresponding to another property of the flowing gas different than that of the carrier gas supply flow sensor 815.

The system 800 can determine flow measurement signals from the input and output flowpaths. The carrier gas supply flow sensor 815 can generate a first flow measurement signal. The column flow sensor 860 can generate a second flow measurement signal. A microcontroller of the system can receive sensed signals from the carrier gas supply flow sensor 815 and the column flow sensor 860.

The system 800 can then alter the flow rate of gas originating from the gas supply port 805 via a change to the flow rate setpoint for the configured gas of the column flow as measured by the flow sensor 860. The system can then determine flow measurement signals from the input and column flowpaths. The carrier gas supply flow sensor 815 can generate a third flow measurement signal, and the column flow sensor 860 can generate a fourth flow measurement signal. The microcontroller of the system can receive sensed signals (e.g., the raw signals from the sensor) from the carrier gas supply flow sensor 815 and the column flow sensor 860.

The system can then calculate a difference between the first set of flow measurement signals originating during the original gas supply port flow rate with the second set of flow measurement signals originating during the adjusted gas supply port flow rate. For example, the gas chromatography system can calculate a first change in flow measurement signal by taking the difference between the first flow measurement signal originating from the carrier gas supply flow sensor 815 and the third flow measurement signal originating from the carrier gas supply flow sensor 815. Likewise, the system can calculate a second change in flow measurement signal by taking the difference between the second flow measurement signal originating from the column flow sensor 860 and the fourth flow measurement signals originating from the column flow sensor 860.

The system can then compare the first change in flow measurement signal to the second change in flow measurement signal. From this comparison, the gas chromatography system can determine whether the inlet is configured for the actual gas. If the change in flow measurement signals (e.g., the deltas from the comparisons) is substantially the same (accounting for system calibration errors), the actual gas is the configured gas type. Additionally, or alternatively, the system can identify the gas type of the actual gas. In some cases, a look-up table can be stored (e.g., by the gas chromatography system or another remote system that the gas chromatography system has access to) that includes a set of equations. The flow measurement signal values can be inputted into these equations, which can be used to match the delta values between the sensors to identify a gas type for the actual gas.

Figure 9:
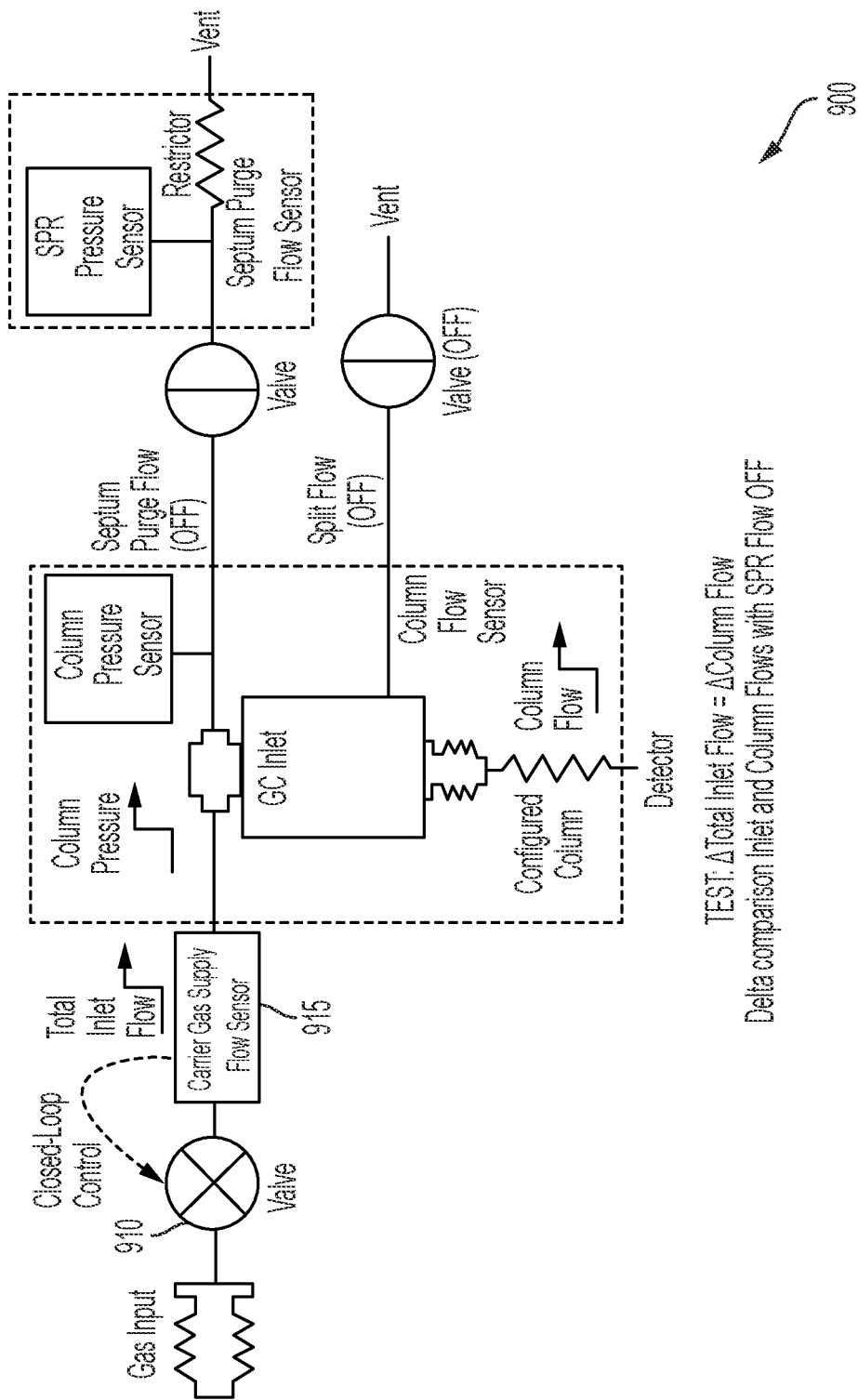

FIG. 9 illustrates a pneumatic system configured for identifying a carrier gas, according to an embodiment of the claimed invention. The system 900 can function in similar ways as the system 800 depicted in FIG. 8 and explained above. However, in the system 900, the valve 910 can be controlled and configured based on measurements received from the carrier gas supply flow sensor 915, whereas the valve in the system 800 can be controlled and configured based on measurements received from the column flow sensor 860.

Figure 10:
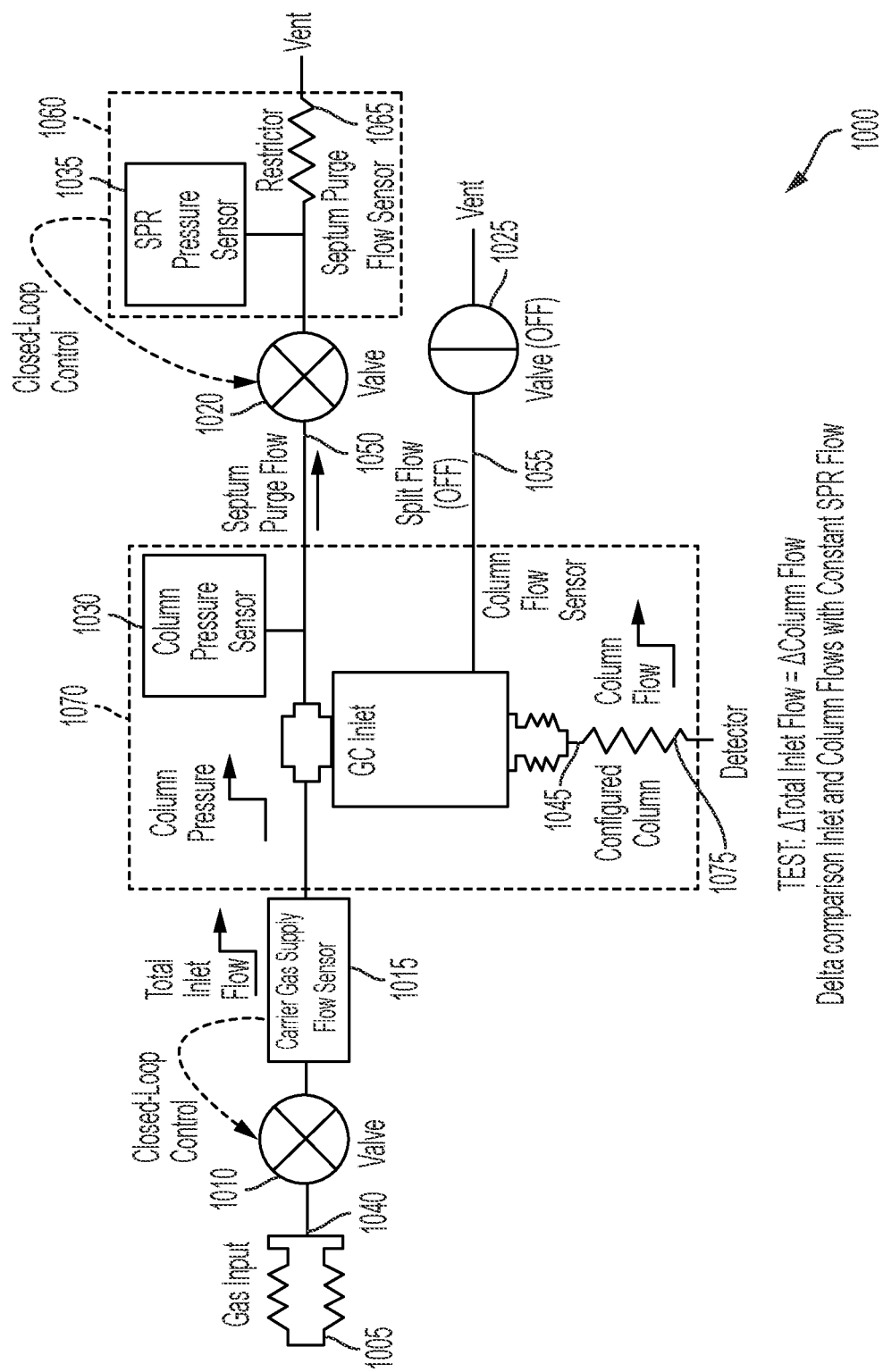

Input/Multiple Output Flow Rate Comparison Using Delta Measurement with Septum Purge Flow Constant In a manner similar to FIG. 7, where the column pressure and therefore flow are held constant and the septum purge flow setpoint is changed, FIG. 10 illustrates an embodiment where the converse is implemented. The septum purge pressure, and therefore flow, is held constant while the column flow rate setpoint is changed.

In one embodiment, the gas chromatography system can monitor step changes in flow measurement signals from the gas input flowpath 1040 and the column flowpath 1045 while the septum purge flowpath 1050 is open (e.g., to a fixed pressure and/or flow setpoint). FIG. 10 illustrates a pneumatic system configured for identifying a carrier gas, according to an embodiment of the claimed invention. The pneumatic system 1000 can be configured to flow a gas into the inlet through the gas supply port 1005. The system 1000 can configure the valve 1010 on the input flowpath 1040 to be open, thereby flowing gas through the valve and through the carrier gas supply flow sensor 1015, where the carrier gas supply flow sensor 1015 can generate flow measurement signals corresponding to a property of the flowing gas.

The system 1000 can further configure the split flowpath 1055 (e.g., via valve 1025) to be closed. Thus, the system 1000 can limit the flow output of the gas to be through the column flowpath 1045 and the septum purge flowpath 1050. Optionally, the septum purge flow sensor 1060 (e.g., the pressure sensor 1035 and restriction 1065) can be kept at a fixed flow rate setpoint and the column flow sensor 1070 (e.g., the pressure sensor 1030 and the column restriction 1075) can generate flow measurement signals flowing out of the inlet and corresponding to another property of the flowing gas. In some cases, a pressure sensor can be relied on to maintain constant pressure through the septum purge flowpath. At least the column flow sensor 1070 can utilize a different property than the carrier gas supply flow sensor 1015 to generate flow measurement signals (e.g., the column flow sensor 1070 can be viscosity-based, using a pressure sensor 1030 over restriction 1075 while the carrier gas supply flow sensor 1015 may be a thermal-dispersion flow sensor).

The system 1000 can determine flow measurement signals from the input and output flowpaths. The carrier gas supply flow sensor 1015 can generate a first flow measurement signal, and the column flow sensor 1070 can generate a second flow measurement signal. A microcontroller of the system can receive sensed signals from the first flow sensor 1010, the septum purge flow sensor 1060 (optionally), and the column flow sensor 1070.

The system 1000 can then alter the flow rate of gas originating from the gas supply port. The system 1000 can then determine flow measurement signals from the input, septum purge (optionally), and column flowpaths. In some cases, the flow rate in the septum purge flowpath can be held constant, and thus flow measurement signals are unnecessary for gas identification. The carrier gas supply flow sensor 1015 can generate a third flow measurement signal, and the column flow sensor 1070 can generate a fourth flow measurement signal. The microcontroller of the system can receive sensed signals from the carrier gas supply flow sensor 1015, the septum purge flow sensor 1060 (optionally), and the column flow sensor 1070.

The system 1000 can then calculate a difference between the first set of flow measurement signals originating during the original gas input flow rate with the second set of flow measurement signals originating during the adjusted gas input flow rate. For example, the system 1000 can calculate a first change in flow measurement signal by taking the difference between the first flow measurement signal originating from the carrier gas supply flow sensor 1015 and the third flow measurement signal originating from the carrier gas supply flow sensor 1015. Likewise, the system 1000 can calculate a second change in flow measurement signal by taking the difference between the second flow measurement signal originating from the column flow sensor 1070 and the fourth flow measurement signal originating from the column flow sensor 1070. From this comparison, the system 1000 can determine whether the configured gas is the actual gas. Additionally or alternatively, the system 1000 can identify the gas type of the flowing gas.

Figure 11:
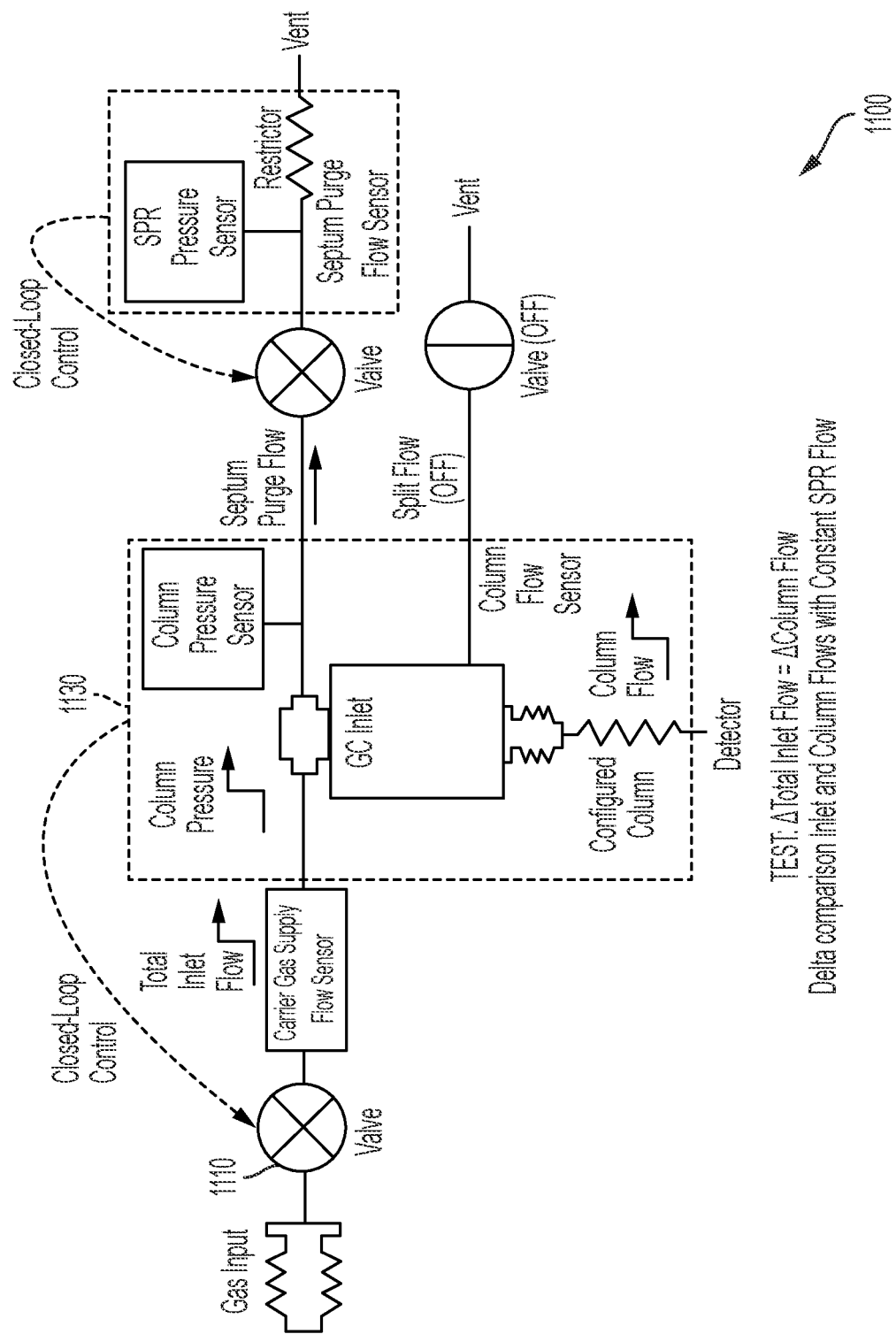

FIG. 11 illustrates a pneumatic system configured for identifying a carrier gas, according to an embodiment of the claimed invention. The system 1100 can function in similar ways as the system 1000 depicted in FIG. 10 and explained above. However, in the system 1000, the valve 1010 can be controlled and configured based on measurements received from the carrier gas supply flow sensor 1015, whereas the valve 1110 in the system 1100 can be controlled and configured based on measurements received from the column flow sensor 1130.

Closed-Loop Feedback

In some cases, the gas chromatography systems described above can control flow rates through a flowpath via a closed-loop system. Closed-loop control can be accomplished by adjusting valves in the system based on flow measurement signals experienced upstream or downstream of the valve to be adjusted. For example, the valve 310 of FIG. 3 can adjust the flow rate of gas flowing through the gas input flowpath. Further, the valve adjustment can be based on flow-rate measurement signals measured at either the column flow sensor or the carrier gas supply flow sensor. The second valve on the septum purge flowpath can likewise be closed-loop controlled based on downstream flow rate readings taken by the septum purge flow sensor (e.g., as in FIG. 5).

These closed-loop control subsystems are particularly valuable in keeping certain gas flow setpoints constant while other gas flow setpoints vary. For example, in the flow measurement change comparison configurations of FIGS. 7-11, gas flow through the input flowpath can be adjusted so that a change in flow rates can be experienced in the system. However, in some cases, it may be beneficial to isolate the step change experienced across a single output flowpath, rather than multiple output flowpaths. Thus, as in the example of FIG. 10, the system can reconfigure the valve 1020 according to flow measurement signals taken by the septum purge flow sensor or just the septum purge pressure sensor to maintain a constant flow rate through the septum purge flowpath as the gas input flow rate is adjusted. Thus, the column flowpath can experience a flow rate change as opposed to both the column and septum purge flowpaths.

It is important to note two important aspects of the original and second flow setpoints (e.g., delta measurements). First, both can be within the operating range of every flow sensor in the system (e.g. so as to not saturate any sensor) and the change in flow setpoint can be large enough so that the calculated percent error is not influenced much by system noise.

It is also important to note that closed-loop control can be dependent on whether the configured gas for the system matches the actual gas flowing in the system. For example, the system can specify flow rate setpoints for the configured gas. However, if the actual gas is not the configured gas, the specified flow rate setpoints may not match the actual flow rate for the gas based on valve adjustments intended for the configured gas.

Further, since the GC systems described herein operate in a splitless mode, the flow through a GC system pertains to the total column flow and septum purge flow (e.g., in some cases the septum purge flow can be set to zero). Therefore, the maximum setpoint limits (e.g., to avoid sensor saturation) on the septum purge flowpath can be 30 mL/min for all flowing gases (or 40 mL/min for a cool-on-column ("COC") inlet). Column flows can be typically less than 10 mL/min for capillary columns, and typically up to 60 mL/min for a packed column.

Gas Type Partitioning by Thermal Diffusivity

A gas chromatography pneumatic system can be utilized to help identify a gas type within the system through thermal properties of the gas. For example, the flow sensor may be a thermal dispersion flow sensor, which can utilize an electrical heater to heat the gas. This heater can be operated either with a fixed voltage or current drive (e.g., which lets temperature vary) or at a fixed temperature (e.g., which lets power vary), depending on the flow rate and the gas in the sensor. When gas is flowing, the required power (fixed temperature heater) or resulting heater temperature (fixed heater drive) is dependent on both the thermal conductivity and heat capacity of the gas type, but in no-flow conditions the required power or resulting heater temperature is only dependent on the thermal conductivity of the gas (e.g., the gas is not carrying away heat so the heat capacity of gas is not a factor). Either heater method can be used to partition an unknown carrier gas into a high-thermal-conductivity group (e.g., a group including Helium and Hydrogen), or a low-thermal-conductivity group (e.g., a group including Nitrogen and Argon-Methane). For example, with Helium and Hydrogen, a fixed temperature heater will require more power and a fixed voltage heater will run at lower temperature than with Nitrogen and Argon-Methane. This partitioning of the gas types can be used along with flow sensors that are based on viscosity difference between the gases to help identify the carrier gas type being used or as a double-check on the gas type identified with the preceding descriptions.

Remediation

In some cases, the system can perform a remediation procedure for the actual gas. For example, the system can identify the actual gas does not match the current configured gas of the system. The system can thus generate and transmit a message (e.g., via a display screen, wirelessly, etc.) to a user corresponding to the incorrect configuration. In some cases, the system can terminate operations of the system, which may protect the system from damage. In some cases, the system can automatically reconfigure to another gas configuration.

Variations in Configurations

Exemplary embodiments of the invention are discussed herein. However, one skilled in the art will understand that a multitude of gas chromatography systems and GC inlets can implement the techniques described. For example, while the above embodiments discuss specific flow sensors, flow sensors can be coupled to any of the carrier gas flowpath, the septum purge flowpath, split flowpath, or any other flowpath of the gas chromatography system. Further, the location of where the flow sensor is coupled to a particular flowpath can be varied as well.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A gas chromatography system comprising:
a pneumatic system comprising at least one input flowpath in fluidic communication with at least a first output flowpath and a second output flowpath;
a first flow sensor located on the input flowpath, the first flow sensor configured to generate a flow measurement signal corresponding to a first property of a gas;
a second flow sensor located on the first output flowpath, the second flow sensor configured to generate a second flow measurement signal corresponding to a second property of the gas different than the first gas property; and
a controller programmed to:
flow gas through the pneumatic system;
determine the first flow measurement signal for the flow of gas through the pneumatic system from the first flow sensor;
determine the second flow measurement signal for the flow of gas through the pneumatic system from the second flow sensor; and
identify a type of gas for the flow of gas through the pneumatic system from the first and second flow measurement signals.

2. The gas chromatography system of claim 1, wherein the microcontroller is further configured to execute a calibration procedure, wherein the calibration procedure comprises:
flow a known type of gas through the pneumatic system;
control a flow rate of the known type of gas via an external flow controller; and
correlate an output of the first and/or second flow sensor, or both, to the controlled flow rate.

3. The gas chromatography system of claim 1, wherein the properties of the gas comprise viscosity and one or more of thermal dispersion, thermal conductivity, and heat capacity.

4. The gas chromatography system of claim 1, wherein the microcontroller is further configured to:
compare the identified type of gas to a configured type of gas; and
generate an alert if the identified type of gas does not match with the configured type of gas.

5. The gas chromatography system of claim 1, wherein the microcontroller is further configured to adjust one or more settings of the gas chromatography system based on the identified type of gas.

6. The gas chromatography system of claim 1, further comprising a third flow sensor located on the second output flowpath, wherein the microcontroller is further configured to:
generate a third flow measurement signal from the third-flow sensor; and
identify the type of gas for the flow of gas through the pneumatic system from the first, second, and third flow measurement signals.

7. The gas chromatography system of claim 1, further comprising an electric heater in fluidic communication with the gas, wherein the controller is further configured to:
control the electric heater to a predetermined voltage, current, or temperature to heat a portion of the gas; and
determine a heater energy for a predetermined heater temperature or a resulting heater temperature for a predetermined heater voltage or current;
wherein identifying the type of gas is further based on either the heater energy or the resulting heater temperature.

8. The gas chromatography system of claim 1, further comprising an electric heater in fluidic communication with the gas, wherein the controller is further configured to:
control the electric heater to a predetermined temperature, voltage, or current; determine a heater energy for a predetermined heater temperature or a resulting heater temperature for a predetermined heater voltage or current; and
partition the possible gas types into at least two groups based on a physical property; and
determine from the heater energy or the resulting heater temperature which of these at least two groups the gas flowing through the pneumatic system belongs.

9. The gas chromatography system of claim 1, wherein the first flow sensor comprises a carrier gas supply flow sensor, and the second flow sensor comprises either a column flow sensor or a septum purge flow sensor.

10. The gas chromatography system of claim 1, further comprising at least one valve located along the input flowpath, the first output flowpath, and/or the second output flowpath, wherein the microcontroller is further configured to cause the at least one valve to modify the flow through the pneumatic system.

11. The gas chromatography system of claim 10, wherein the at least one valve is located along the first output flowpath and/or the second output flowpath, and wherein the at least one valve is substantially closed.

12. The gas chromatography system of claim 1, wherein the flow measurement signals are flow rates for a configured gas.

13. The gas chromatography system of claim 12, further comprising a third flow sensor located on the second output flowpath, wherein the microcontroller is further configured to:
generate a third flow rate from the third-flow sensor for the assumed configured gas type;
sum the second flow rate and the third flow rate; and
compare the summed flow rates to the first flow rate and determine if the assumed configured gas type corresponds to the type of gas flowing through the pneumatic system according to the comparison.

14. The gas chromatography system of claim 13, wherein the microcontroller is further configured to:
determine that the assumed configured gas type corresponds to the type of gas flowing through the pneumatic system based on a difference between the summed flow rates and the first flow rate being below a threshold.

15. The gas chromatography system of claim 13, wherein the microcontroller is further configured to:
identify the type of gas for the flow of gas through the pneumatic system based on the difference between the summed flow rates and the first flow rate and on comparing the difference to an expected difference for one or more expected gas type.

16. A gas chromatography system comprising:
a pneumatic system comprising at least one input flowpath in fluidic communication with at least a first output flowpath and a second output flowpath;

a first flow sensor located on the input flowpath, the first flow sensor configured to utilize a first property of a gas to generate a flow measurement signal;

a second flow sensor located on the first output flowpath, the second flow sensor configured to utilize a second property of the gas different than the first gas property to generate a flow measurement signal; and a microcontroller programmed to:
flow gas through the pneumatic system to generate a first flow measurement signal from the first flow sensor and a second flow measurement signal from the second flow sensor;

change the flow rate of gas through the input flowpath and first output flowpath while keeping the flow rate of the gas through the second output flowpath substantially constant and generate a third flow measurement signal from the first flow sensor and a fourth flow measurement signal from the second flow sensor;

calculate a first change in flow measurement signal by taking the difference between the first and third flow measurement signals;

calculate a second change in flow measurement signal by taking the difference between the second and fourth flow measurement signals; and identify a type of gas by comparing the first change in flow measurement signal to the second change in flow measurement signal.

17. The gas chromatography system of claim 16, wherein the microcontroller is further configured to execute a calibration procedure, wherein the calibration procedure comprises:

flow a known type of gas through the pneumatic system;

control a flow rate of the known type of gas via an external flow controller; and correlate an output of the first and/or second flow sensor to the controlled flow rate.

18. The gas chromatography system of claim 16, wherein the microcontroller is further configured to:

compare the identified type of gas to a configured type of gas; and generate an alert if the identified type of gas does not match with the configured type of gas.

19. The gas chromatography system of claim 16, further comprising at least one valve located along the input flowpath, the first output flowpath, the second output flowpath, or any combination, wherein the microcontroller is further configured to utilize the valve(s) to modify the flow through the pneumatic system.

20. The gas chromatography system of claim 19, wherein the at least one valve is located along the first output flowpath and/or the second output flowpath, and wherein the at least one valve is substantially closed.

* * * * *